United States Patent
Arcienega et al.

(10) Patent No.: US 11,921,762 B2
(45) Date of Patent: *Mar. 5, 2024

(54) DOMAIN ASSISTANT SYSTEM AND METHOD

(71) Applicant: Telepathy Labs, Inc., Tampa, FL (US)

(72) Inventors: Mijail Arcienega, Zurich (CH);
Bilyana Taneva, Zurich (CH);
Elisabetta Carta, Zurich (CH);
Stephen Brown, Singapore (SG);
Lawrence Seth Lefkowitz, Tampa, FL (US); Josselyn Boudett, Tampa, FL (US)

(73) Assignee: Telepathy Labs, Inc, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,166

(22) Filed: Dec. 16, 2022

(65) Prior Publication Data

US 2023/0195766 A1 Jun. 22, 2023

Related U.S. Application Data

(63) Continuation of application No. 16/965,526, filed as application No. PCT/US2019/015413 on Jan. 28, 2019, now Pat. No. 11,615,127.

(60) Provisional application No. 62/623,369, filed on Jan. 29, 2018.

(51) Int. Cl.
*G06F 16/00* (2019.01)
*G06F 16/332* (2019.01)

(52) U.S. Cl.
CPC .............. *G06F 16/3329* (2019.01)

(58) Field of Classification Search
CPC .................................. G06F 16/3329
USPC ........................................ 707/765
See application file for complete search history.

(56) References Cited

U.S. PATENT DOCUMENTS

2019/0042988 A1* 2/2019 Brown ............... G06N 5/022

* cited by examiner

*Primary Examiner* — Monica M Pyo
(74) *Attorney, Agent, or Firm* — Michael T. Abramson; Jordan IP Law, LLC

(57) ABSTRACT

A method, computer program product, and computer system identifying an intent relating to a query associated with an object. A plurality of informational items associated with the object may be identified. At least a first informational item associated with the object for which a first portion of information is already known may be identified. At least a second informational item associated with the object for which a second portion of information is unknown may be identified. A question may be generated to determine the second portion of information based upon the second portion of information being unknown. An answer may be received to determine the second portion of information. A response to the intent relating to the query may be provided based upon the first informational item for which the first portion of information is already known and the answer for the question generated to determine the second portion of information.

20 Claims, 12 Drawing Sheets

500

600

1200

DOMAIN ASSISTANT SYSTEM AND METHOD

RELATED CASES

This application is a continuation of U.S. patent application Ser. No. 16/965,526 filed on Jul. 28, 2020, which is a 371 of the PCT Application No. PCT/US2019/015413, filed on Jan. 28, 2019, which claims the benefit of U.S. Provisional Application No. 62/623,369, filed on 29 Jan. 2018, the contents of which are all incorporated by reference.

BACKGROUND

Question and Answer (Q&A) systems may be used, e.g., to help a user solve problems or answer questions. Typically, a user asks a question (e.g., using a multimodal input) and the system attempts to gather the information needed to address the user's question. Generally, standard conversational workflows use a fixed set of questions, in a specific order, to get information from the user. That is, such Q&A systems typically use a hard-coded path to a result where a fixed set of tasks are used for a set of fairly rigid conversational workflows to interact with any user to collect needed information and to present results.

BRIEF SUMMARY OF DISCLOSURE

In one example implementation, a method, performed by one or more computing devices, may include but is not limited to identifying, by a computing device, an intent relating to a query associated with an object. A plurality of informational items associated with the object may be identified. At least a first informational item of the plurality of informational items associated with the object for which a first portion of information is already known may be identified. At least a second informational item of the plurality of informational items associated with the object for which a second portion of information is unknown may be identified. A question may be generated to determine the second portion of information based upon, at least in part, the second portion of information being unknown. An answer may be received for the question generated to determine the second portion of information. A response to the intent relating to the query may be provided based upon, at least in part, at least the first informational item for which the first portion of information is already known and the answer for the question generated to determine the second portion of information.

One or more of the following example features may be included. The answer for the question may be generated from a virtual agent. A sequence of a plurality of questions to be generated may be determined. The sequence of the plurality of questions to be generated may be determined based upon, at least in part, one of user information and context. The sequence of the plurality of questions to be generated may be determined based upon, at least in part, a probability that the second portion of information is needed to provide the response to the query. Determining the sequence of the plurality of questions to be generated may include excluding generation of a second question for determining the first portion of information. A service for a second object associated with the object may be identified and one or more additional questions associated with the service may be generated. The question may be one of a direct question and an indirect question to determine the second portion of information.

In another example implementation, a computing system may include one or more processors and one or more memories configured to perform operations that may include but are not limited to identifying an intent relating to a query associated with an object. A plurality of informational items associated with the object may be identified. At least a first informational item of the plurality of informational items associated with the object for which a first portion of information is already known may be identified. At least a second informational item of the plurality of informational items associated with the object for which a second portion of information is unknown may be identified. A question may be generated to determine the second portion of information based upon, at least in part, the second portion of information being unknown. An answer may be received for the question generated to determine the second portion of information. A response to the intent relating to the query may be provided based upon, at least in part, at least the first informational item for which the first portion of information is already known and the answer for the question generated to determine the second portion of information.

One or more of the following example features may be included. The answer for the question may be generated from a virtual agent. A sequence of a plurality of questions to be generated may be determined. The sequence of the plurality of questions to be generated may be determined based upon, at least in part, one of user information and context. The sequence of the plurality of questions to be generated may be determined based upon, at least in part, a probability that the second portion of information is needed to provide the response to the query. Determining the sequence of the plurality of questions to be generated may include excluding generation of a second question for determining the first portion of information. A service for a second object associated with the object may be identified and one or more additional questions associated with the service may be generated. The question may be one of a direct question and an indirect question to determine the second portion of information.

In another example implementation, a computer program product may reside on a computer readable storage medium having a plurality of instructions stored thereon which, when executed across one or more processors, may cause at least a portion of the one or more processors to perform operations that may include but are not limited to identifying an intent relating to a query associated with an object. A plurality of informational items associated with the object may be identified. At least a first informational item of the plurality of informational items associated with the object for which a first portion of information is already known may be identified. At least a second informational item of the plurality of informational items associated with the object for which a second portion of information is unknown may be identified. A question may be generated to determine the second portion of information based upon, at least in part, the second portion of information being unknown. An answer may be received for the question generated to determine the second portion of information. A response to the intent relating to the query may be provided based upon, at least in part, at least the first informational item for which the first portion of information is already known and the answer for the question generated to determine the second portion of information.

One or more of the following example features may be included. The answer for the question may be generated from a virtual agent. A sequence of a plurality of questions to be generated may be determined. The sequence of the plurality of questions to be generated may be determined based upon, at least in part, one of user information and context. The sequence of the plurality of questions to be generated may be determined based upon, at least in part, a probability that the second portion of information is needed to provide the response to the query. Determining the sequence of the plurality of questions to be generated may include excluding generation of a second question for determining the first portion of information. A service for a second object associated with the object may be identified and one or more additional questions associated with the service may be generated. The question may be one of a direct question and an indirect question to determine the second portion of information.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
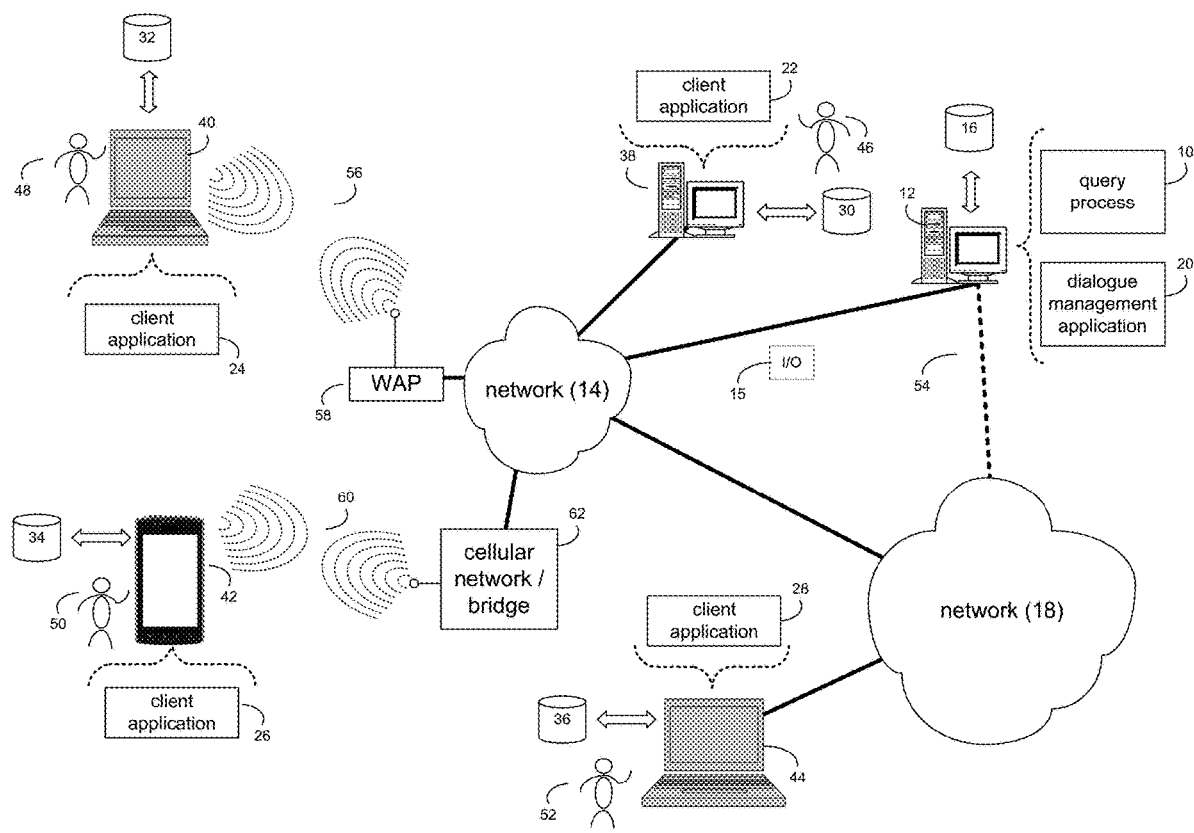
FIG. 1 is an example diagrammatic view of a query process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java °, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown query process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a query process, such as query process 10 of FIG. 1, may identify an intent relating to a query associated with an object. A plurality of informational items associated with the object may be identified. At least a first informational item of the plurality of informational items associated with the object for which a first portion of information is already known may be identified. At least a second informational item of the plurality of informational items associated with the object for which a second portion of information is unknown may be identified. A question may be generated to determine the second portion of information based upon, at least in part, the second portion of information being unknown. An answer may be received for the question generated to determine the second portion of information. A response to the intent relating to the query may be provided based upon, at least in part, at least the first informational item for which the first portion of information is already known and the answer for the question generated to determine the second portion of information.

In some implementations, the instruction sets and subroutines of query process which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, query process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a dialogue management application (e.g., dialogue management application 20), examples of which may include, but are not limited to, e.g., a virtual assistant application, a domain assistant application, a query application, a datastore/knowledge base application, a service fulfillment application, an automatic speech recognition (ASR) application, examples of which may include, but are not limited to, e.g., an automatic speech recognition (ASR) application (e.g., modeling, etc.), a natural language understanding (NLU) application (e.g., machine learning, intent discovery, etc.), a text to speech (TTS) application (e.g., context awareness, learning, etc.), a speech signal enhancement (SSE) application (e.g., multi-zone processing/beamforming, noise suppression, etc.), a voice biometrics/wake-up-word processing application, a website application, an Instant Messaging (IM)/"chat" application, a short messaging service (SMS)/multimedia messaging service (MMS) application, or other application that allows for receiving and/or responding to a user's computer based query. In some implementations, query process 10 and/or dialogue management application 20 may be accessed via one or more of client applications 22, 24, 26, 28. In some implementations, query process 10 may be a standalone application, or may be an applet/application/script/extension that may interact with and/or be executed within dialogue management application 20, a component of dialogue management application 20, and/or one or more of client applications 22, 24, 26, 28. In some implementations, dialogue management application 20 may be a standalone application, or may be an applet/application/script/extension that may interact with and/or be executed within query process 10, a component of query process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of query process 10 and/or dialogue management application 20. Examples of client applications 22, 24, 26, 28 may include, but are not limited to, e.g., a virtual assistant application, a domain assistant application, a query application, a datastore/knowledge base application, a service fulfillment application, ASR application, a website application, an Instant Messaging (IM)/"chat" application, a short messaging service (SMS)/multimedia messaging service (MMS) application, or other application that allows for receiving and/or responding to a user's computer based query, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., audio/video, photo, etc.) capturing and/or output device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of query process 10 (and vice versa). Accordingly, in some implementations, query process 10 may be a purely server-side application, a purely client-side application, or a hybrid server-side/client-side application that is cooperatively executed by one or more of client applications 22, 24, 26, 28 and/or query process 10.

In some implementations, one or more of client applications 22, 24, 26, 28 may be configured to effectuate some or all of the functionality of dialogue management application 20 (and vice versa). Accordingly, in some implementations, dialogue management application 20 may be a purely server-side application, a purely client-side application, or a hybrid server-side/client-side application that is cooperatively executed by one or more of client applications 22, 24, 26, 28 and/or dialogue management application 20. As one or more of client applications 22, 24, 26, 28, query process 10, and dialogue management application 20, taken singly or in any combination, may effectuate some or all of the same functionality, any description of effectuating such functionality via one or more of client applications 22, 24, 26, 28, query process 10, dialogue management application 20, or combination thereof, and any described interaction(s) between one or more of client applications 22, 24, 26, 28, query process 10, dialogue management application 20, or combination thereof to effectuate such functionality, should be taken as an example only and not to limit the scope of the disclosure.

In some implementations, one or more of users 46, 48, 50, 52 may access computer 12 and query process 10 (e.g., using one or more of client electronic devices 38, 42, 44) directly through network 14 or through secondary network 18. Further, computer 12 may be connected to network 14 through secondary network 18, as illustrated with phantom link line 54. Query process 10 may include one or more user interfaces, such as browsers and textual or graphical user interfaces, through which users 46, 48, 50, 52 may access query process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
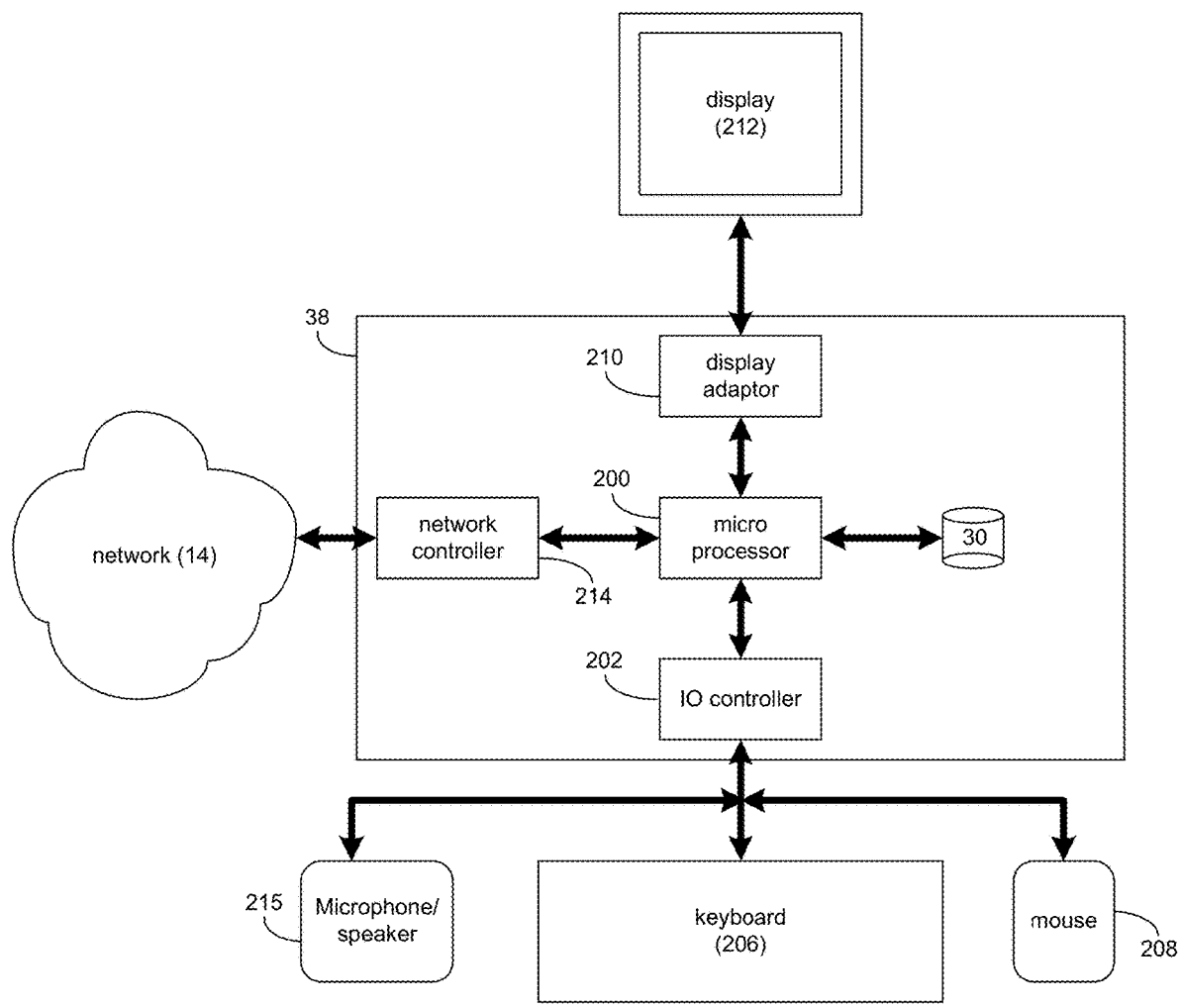
FIG. 2 is an example diagrammatic view of a client electronic device of FIG. 1 according to one or more example implementations of the disclosure.
Figure 3:
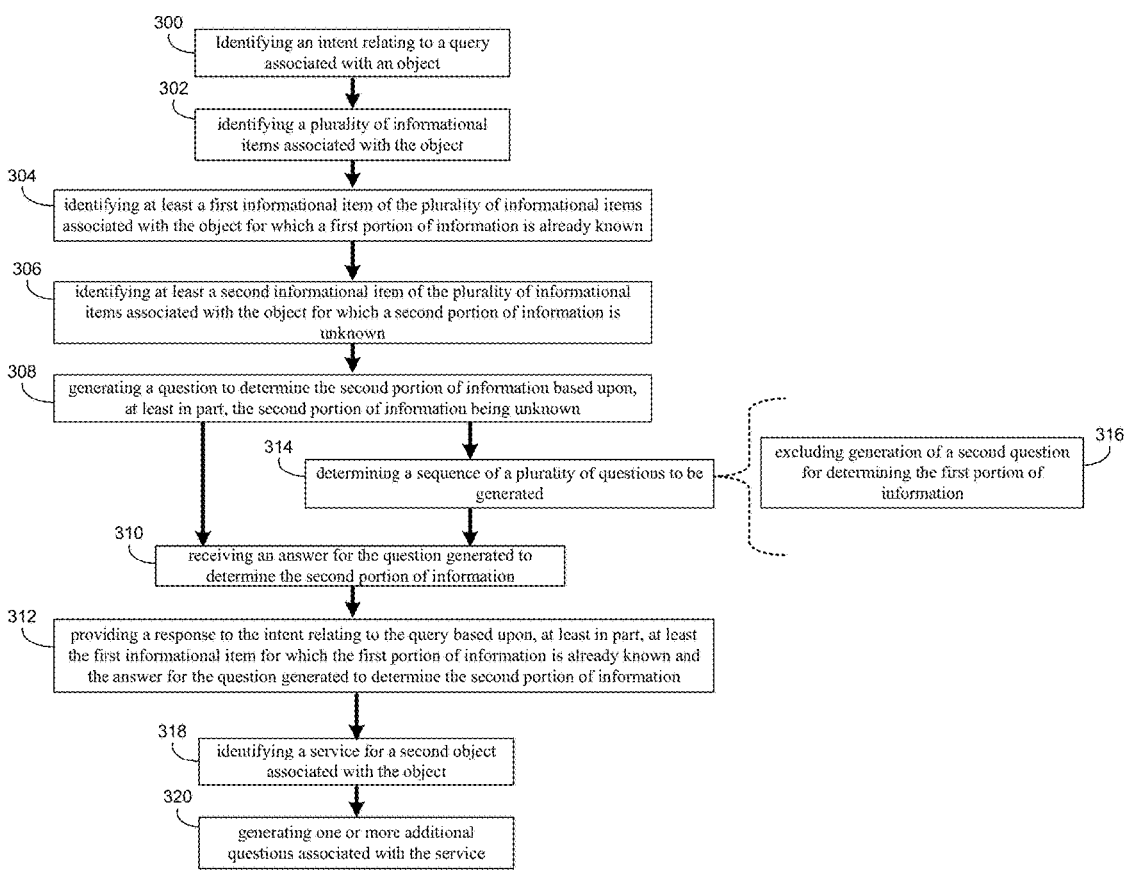
FIG. 3 is an example flowchart of a query process according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, query process 10 may be substituted for client electronic device 38 (in whole or in part) within FIG. 2, examples of which may include but are not limited to computer 12 and/or one or more of client electronic devices 38, 40, 42, 44.

In some implementations, client electronic device 38 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 30). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), custom device (e.g., microphone/speaker 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed below, query process 10 may at least help, e.g., improve a technology necessarily rooted in computer technology in order to overcome an example and non-limiting problem specifically arising in the realm of computer systems associated with, e.g., the practical application of receiving and/or responding to a user's query. It will be appreciated that the computer processes described throughout are integrated into one or more practical applications, and when taken at least as a whole are not considered to be well-understood, routine, and conventional functions.

The Query Process:

As discussed above and referring also at least to the example implementations of FIGS. 3-11, query process 10 may identify 300 an intent relating to a query associated with an object. Query process 10 may identify 302 a plurality of informational items associated with the object. Query process 10 may identify 304 at least a first informational item of the plurality of informational items associated with the object for which a first portion of information is already known. Query process 10 may identify 306 at least a second informational item of the plurality of informational items associated with the object for which a second portion of information is unknown. Query process 10 may generate 308 a question to determine the second portion of information based upon, at least in part, the second portion of information being unknown. Query process 10 may receive 310 an answer for the question generated to determine the second portion of information. Query process 10 may provide 312 a response to the intent relating to the query based upon, at least in part, at least the first informational item for which the first portion of information is already known and the answer for the question generated to determine the second portion of information.

In some implementations, query process 10 may be integrated with (or have access to) an example domain assistant system. For example, referring at least to the example implementation of FIG. 4, an example domain assistant system 400 is shown. It will be appreciated that domain assistant system 400 may have more or fewer components, components that may be combined with various components, and have other configurations, such as being integrated into the environment of FIG. 1, without departing from the scope of the present disclosure. As such, the specific configuration and components shown in FIG. 4 should be taken as example only and not to otherwise limit the scope of the disclosure. The domain assistant 400 may be generally defined as a system that assists a user in addressing different needs in a particular field (e.g., automotive industry field) or multiple fields. Domain assistant 400 may assist the user in addressing one or more needs through one or more service domains. This may be accomplished by, e.g., accessing answers (e.g., information) to questions that are received or obtained, but may also include executing one or more predetermined tasks (e.g., actions) after a request for such a task(s) has been received. A request by the user may refer to any type of request (e.g., task to be completed, request for information obtained from query, etc.) and a response may refer to any type of response from the system (e.g., executed task type of response, information provided type of response, etc.). Domain assistant 400 may assist with other types of requests and/or responses without departing from the scope of the disclosure.

In some implementations, domain assistant system may include, for example, an understanding module, a conversation query manager (CQM), and a knowledge module. In some implementations, the two main parts used to drive the workflow of the domain assistant system may include, e.g., the understanding module and the knowledge module. The CQM (which in some implementations may be a component of query process 10) may be used to translate messages and other information into proper formats between the understanding module and the knowledge module.

In some implementations, this may form a loop e.g., user information from client electronic device 42 may be input to the understanding module (which in some implementations may be a component of query process 10) and may be routed through the CQM to get an answer from the knowledge module (which in some implementations may be a component of query process 10), the answer may come back through the CQM, and the understanding module may process the answer and may send the answer to the user in a way that makes sense to the user. In some implementations, the user (e.g., user 50) may provide input to query process 10 using any conventional technique and/or user interface (e.g., speech, text, etc.).

Similarly, the understanding module may have a multi-modal input that may include speech, text, or another type of input. In some implementations, the understanding module may include, e.g., ASR, NLU, and a Dialog Manager (DM) (each of which in some implementations may be a component of query process 10). Using at least some of these components may help the understanding module determine and understand what is being requested by the user. Generally, but without limitation, the ASR may send recognized speech to the NLU, which may send a determined intent of the user request to the DM. Generally, but without limitation, speech input from the user may be directed to the ASR, text input may be directed to the NLU, and application user interface (UI) input may be directed to DM.

In some implementations, the understanding module (e.g., via query process may provide various example functionalities. For example, the understanding module may interpret the user input (e.g., understand how to communicate with the user such as understanding English, please, thank you, etc.). The understanding module may drive actions to provide next steps of the domain assistant that may run a service workflow, such as a configuration workflow with steps that may provide an answer to the user's query. The understanding module may convert the user input into a request to the knowledge module and may interpret answers from the knowledge module (e.g., understanding what the user meant and presenting results in a manner understandable to the user). Workflow may be mapped explicitly or generated dynamically, dynamically possibly including goal planning/route optimization/optimization of existing workflow. The understanding module may provide answers to the user (e.g., next step of service workflow such as a configuration workflow). In some implementations, the understanding module may include, e.g., a text-to-speech (TTS) module and a natural language generation (NLG) module (each of which in some implementations may be a component of query process 10), and may be used depending on the output type provided to the user (e.g., NLG for text and TTS for speech).

In some implementations, the understanding module may store and make use of previous user inputs, from the current or prior conversations with the user, in order to better understand the user's current input. As a result of tracking the user's input, the understanding module may know where in the workflow a user is at any time, and may keep track of this as the conversation continues. Additionally, the understanding module may also store other information in a user KB (e.g., location of the user, user preferences, etc.).

In some implementations, the understanding module may look for answers by gathering knowledge from the knowledge module via the CQM. The understanding module may set up the query and may then use the CQM to convert the query to pull relevant knowledge or information from the knowledge module. For example, the CQM may provide example functionalities (e.g., via query process 10). For instance, the CQM may provide translating functionality (e.g., transform a DM query from the understanding module into a knowledge query such as knowledge base (KB) query or user KB query (e.g., using cypher, SQL, etc.)). The CQM may format answers from the knowledge module for consumption by the DM of the understanding module, and may enable the understanding module and knowledge module to communicate with each other. In some implementations, the CQM may be designed specific to each knowledge module based on one or more knowledge bases (KBs) and/or one or more databases (DBs) and/or one or more user KBs of the knowledge module.

In some implementations, the knowledge module may include one or more KBs and/or one or more databases DBs and/or one or more user KBs relating to one or more domains. Generally, the KB and user KB may be capable of encoding complex structured and unstructured data, whereas a table-based DB (or other DB type) may be more suited to encode structured information. Typically, a KB may be a graph model and a DB may be table-oriented, document oriented, or key value store; however, it will be appreciated that other configurations are possible. User knowledge may or may not be integrated into the user KB. For example, user knowledge may be integrated into the user KB or commingled with other data (e.g., organization data such as company data) in another KB or DB. As such, it will be understood that the user knowledge may be found in other data source arrangements or configurations without departing from the scope of the disclosure.

In some implementations, the knowledge module may include information on one or more service domains (e.g., configuration domains), such as everything to know about printers, tractors, machines, etc. In some implementations, the knowledge module may include information about dependencies between options (e.g., compatibility). For instance, the knowledge module may be able to determine whether a particular component (e.g., ink cartridge) is compatible with a system such as a particular printer (e.g., yes or no). Similarly, the knowledge module may have information associated with the requirements for a requested option (e.g., user wants to install a particular component and the requirements may include (1) order the component, (2) receive the component, (3) receive instructions on how to install the component, and query process 10 may determine next steps).

In some implementations, given a particular workflow step, the knowledge module may have information associated with the next step that needs to be performed (e.g., if the user is at position in the workflow to select a component such as an item to be ordered, then, if user orders it, the next step may be that user will receive a confirmation, after which then the query process 10 may contact the user by email about how to track package that includes the ordered item, etc.).

In some implementations, the knowledge module may have information associated with configuration elements and their properties. For example, the knowledge module may have information about what is configurable and the limits required in a configuration (e.g., a component such as a specific bucket has width and capacity and the bucket may be mounted on some machines but not mounted on other machines, etc.).

In some implementations, the user knowledge base may have information associated with the user, independent of their interaction in the current conversation. For example, the user KB may know a user's organization, job function, location, position in the organization structure, etc. and this may inform the interpretation of the user's input or of the response by query process 10. For instance, if the user requests a summary of his or her sales figures, query process 10 may determine which sales should be included in those results based on information in the user KB. As another example, if a user works in a certain industry, that knowledge could inform the selection of appropriate equipment options when configuring their machinery.

Figure 4:
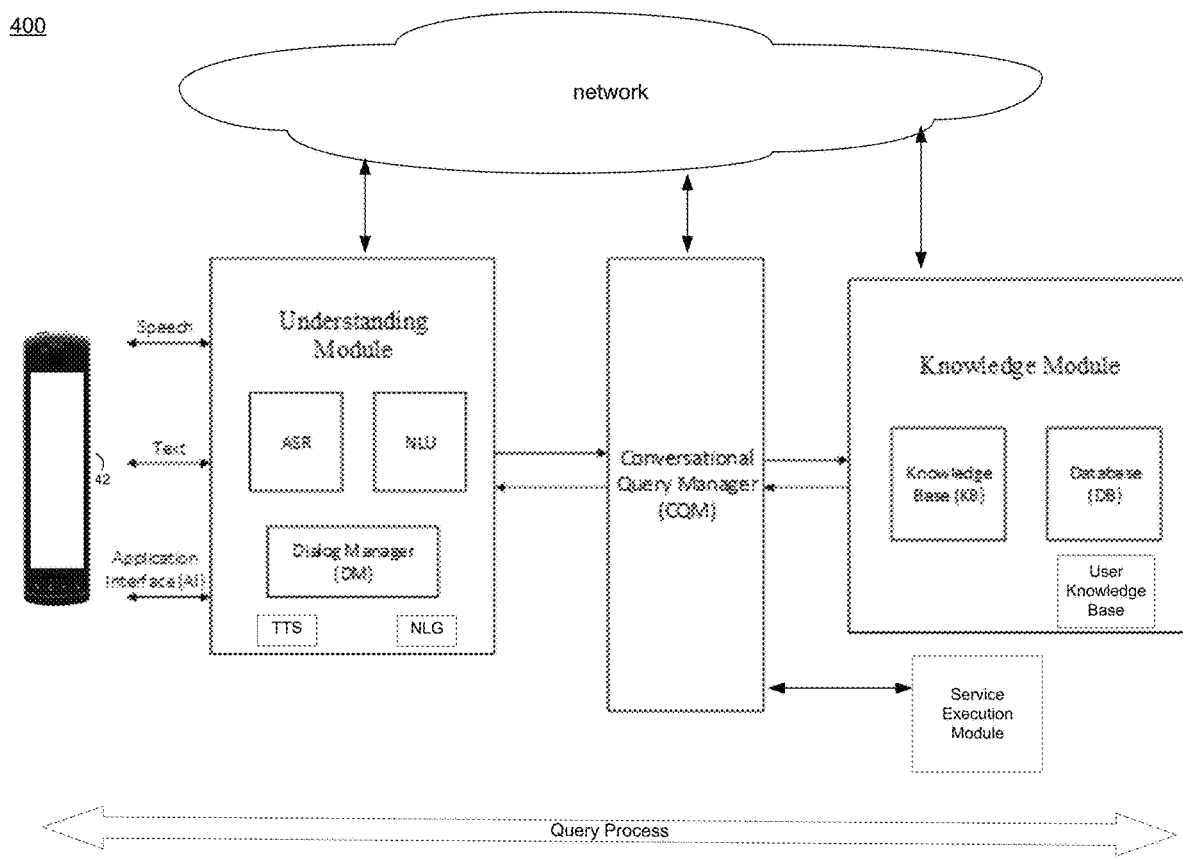
FIG. 4 is an example diagrammatic view of a query process coupled to an example distributed computing network according to one or more example implementations of the disclosure.

As described above, the domain assistant may be realized by query process 10 as shown in FIG. 4. In some examples, the domain assistant may be implemented in a hierarchical manner, e.g., trigger specific domain services to accomplish subparts of a user request. For example, the domain assistant may run query process 10 (or vice versa) such that query sub-processes (corresponding to domain services) are all implemented as shown in FIG. 4. For example, each query sub-process may correspond with a domain service (e.g., configuration service or configuration service). In other examples, multiple query sub-processes may correspond with a domain service.

In some implementations, the domain assistant system may include, for example, a service execution module (which in some implementations may be a component of query process 10) that may satisfy a broad set of user requests relating to one or more services (domain services). For example, the service execution module may be used for taking care of actions related to a particular service. The service execution module of the query process triggers at least one query sub-process (relating to a specific domain service). For example, the DM may issue instructions to the service execution module directing the service execution module to trigger or initiate at least one query sub-process. The service execution module may also implement software programmable tasks with respect to one or more specific services (e.g., place an order, create a record on database of orders, set a reminder for a machine's scheduled maintenance on the owner's digital calendar, etc.).

Thus, as a brief summary, the DM of the understanding module may drive transformation from natural language to a CQM query. The DM of the understanding module may produce a DM information/data request to be targeted for a database (DB) of the knowledge module. The CQM may translate the high-level DM information request from the understanding module to one or more query languages as addressed to the KB and/or DB and/or user KB of the knowledge module. With respect to configuration service, the KB (e.g., graph database) of the knowledge module may have encoded compatibility options in a way so that a next configuration option may be deduced using, e.g., node information queries, inference logic or graph traversals (e.g., based on a query request from the DM). The knowledge module may send the answers (based on information queries from DM) back to the CQM, which in turn may format the answer for DM consumption to allow the understanding module to drive the next user interaction (e.g., interaction may be multi-modal such that output may be voice-related using NLG/TTS, displayed on screen, provided as text, or any other output described throughout or known to those skilled in the art, etc.). At certain points in the process, and based on required information, tasks may be triggered though the service execution module. It will be appreciated that the functionalities described above and throughout may be integrated into more, fewer and/or different components. As such, the specific interactions described between various components should be taken as example only and not to otherwise limit the scope of the present disclosure.

As will be discussed below, query process 10 may have both proactive and interactive capabilities. For example, interactive capabilities may generally be described as being primarily active when the user is actively talking or otherwise interacting with query process 10, whereas the proactive capabilities may generally be described as monitoring domain and external knowledge that is accessible (e.g., visible). Depending on context/areas of responsibility, query process 10 may trigger an action, where that action may or may not include, e.g., establishing contact/speaking to the user and thus converting a proactive action into an interactive one, record keeping, publication to other systems, triggering workflows, etc.

In an example summary, query process 10 may generally involve having a command or query issued by a user (e.g., based on an intent) and having query process 10 attempt to interpret that intent and respond appropriately. There may be different types of "triggers" that indicate the existence of an intent, such as changes in the world state (including the passage of, or reaching of, a certain time), actions taken by other agents or systems, conditions on available data (e.g., some value exceeding a threshold), or conversational actions or states (e.g., the user repeatedly asking for clarification). The intent may typically include some type of goal. After the goal is satisfied, the domain assistant may identify a related or follow-on goal (e.g., an "up-sell" opportunity after the user has purchased some good or service) as will be discussed further below.

There are different ways for intent to be identified. For example, the domain assistant (e.g., via query process 10) may obtain intent from the user by: (1) getting a command from the user (from which the system is expected to determine the user's intent), and (2) getting additional information needed to flush out the intent (e.g., intent parameters (entities) that may not have been specified initially). The domain assistant may also obtain information to complete a fulfillment of that intent. As an example, suppose a user wishes to book a plane trip. There may be on the order of a dozen parameters that are required to select the appropriate flight and it is highly unlikely that the user will specify all of them in the initial request. If the domain assistant accepts that an initial intent specification need not include all of the values needed to satisfy the intent, then it becomes somewhat arbitrary as to which parameters should be considered as part of the intent signature and which will be acquired as part of intent satisfaction. For example, any of the following may be considered a legitimate user intent:

I'd like to buy a bucket.
I'd like to buy a 48" bucket.
I'd like to buy a heavy-duty bucket.
I'd like to buy a heavy-duty 48" bucket.
I'd like to buy a heavy-duty 48" bucket for use with a pin grabber coupler.
I'd like to buy a heavy-duty 48" bucket with a bolt-o cutting edge for use with a pin grabber coupler.

In some implementations, query process 10, as part of its general processing flow, may include one or more capabilities, e.g., the ability to identify information it needs and the ability to identify and prioritize sources for that information. Given that capability, query process 10 may not need to request information from the user if it has a preferable source for it, where that preference may be based on a number of factors. Thus, if the needed information is already available "in memory" or from an easily accessed data source, those may typically be used rather than invoking a query to the user.

In some implementations, query process 10 may identify 300 an intent relating to a query associated with an object. For instance, assume for example purposes only that a user (e.g., user 50) is interacting with query process 10 via an example and non-limiting user interface, such as UI 500 shown in the example implementation of FIG. 5. In the example, UI 500 may enable user 50 to interact with, e.g., a virtual agent or other type of interactive system. In some implementations, once user 50 has started an interactive session, query process 10 may identify 300 the user's intent (e.g., an action or activity the user wishes to invoke or a state the user intends to achieve) relating to a query associated with an object. In the case of an interface where user 50 may physically select an item/object, this may be a definitive indication of the intent. However, speaking/typing in natural language may require query process 10 to recognize the language and interpret the intent, where the intent may be identified (for example) from any combination of the following: The user's spoken or written utterance, the user's interaction with visual/interactive elements of an application (such as UI 500), the user's context that exists up to that point in time (e.g., past actions, history of user such what was said, location of user, users preferences, attributes, organizational knowledge, where in the UI is the user currently, knowledge available for user such as customer relationship management (CRM-type) knowledge etc.), domain context (e.g., any other assumptions about the domain associated with the user's query that would help identify intent), directly based on what was asked for and/or interacted with, as well as indirectly based on the above-noted history and context.

Figure 5:
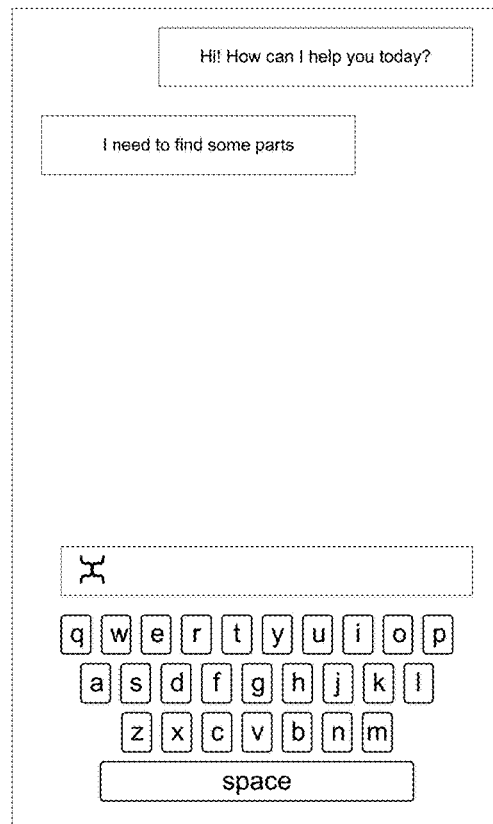
FIG. 5 is an example diagrammatic view of a user interface according to one or more example implementations of the disclosure.
Figure 5:
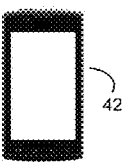

In the example shown at FIG. 5, assume for example purposes only that user 50 uses UI 500 to say, "Can you find me a fork for my skid steer." In the example, the intent may be derived directly from what the user says (i.e., user 50 has the intent of needing something for his system such as skid steer, where the object of the intent is the component such as fork which may be requested in a query). If the intent is clear, query process 10 may be able to determine the appropriate service. However, assume instead for example purposes only that user 50 says, "I need to find some parts." In this case, where the intent is unclear or ambiguous, query process 10 may ask for clarification or more detail, or present options to simplify the process of identifying intent, which will be discussed further below.

As described above, query process 10 may be triggered by a variety of signals, e.g., either user-initiated actions (interactive) or based on information provided by background processes (proactive). Changes to a world model of query process 10 may cause it to identify potentially relevant user intents and system activities. For example, a publication of a service bulletin may be recognized as relevant to a user's goal of maintaining their equipment and may trigger an action of providing that information to the user. Further, an intent or goal may be determined from known user actions, user dialogue, events, and/or user-initiated actions. Recognition of a user's intent may, itself, hint at other possible intents. For example, the purchase of a piece of equipment may establish goals for subsequent maintenance, servicing, or insuring of that equipment (as will be discussed further below). In another example, query process 10 may monitor activity relating to a service work on the user's system such as equipment (e.g., tractor) indicating that a component (or part) is needed for repair (e.g., a gear broke and needs to be replaced, thus suggesting intent or goal of purchasing a new gear). In some implementations, query process 10 may monitor activity indicating that a component needs to be replaced for a system due to new safety rules or other legal regulations impacting the system, thus hinting at an intent to purchase a replaceable component. Where potential intents or goals are determined indirectly, query process 10 may confirm the intent with the user, e.g., via UI 500.

In some implementations, each intent (e.g., goal) type may correspond to either a set of utterances (where this mapping is learned by query process 10 via training data), an interaction with the application user interface, or by a set of conditions that indicate the goal state. After each user interaction or state change, query process 10 may attempt to identify matching (or at least potentially matching) intents and may then make additional queries, either to the user or to other systems or data sources, to confirm the intent.

In some implementations, the user's action or state change may be sufficient to imply one or more potential intents but may not provide enough information for the intent to be fully specified. As a simple example, query process 10 may recognize that the user wishes to travel to Chicago, but may not yet know the desired travel date. By understanding what information is required to fully specify each intent, query process 10 may proceed to obtain the additional needed information. As will be discussed further below, this may involve further interactions with the user, data lookups, or invocations of other systems or services. In some implementations, if query process 10 already has or can obtain this information, it may avoid unnecessary interactions (e.g., asking questions) with the user, or may choose to present the information being known for validation by the user.

In some implementations, assuming that query process 10 has identified one more user intents, it may select an appropriate service to satisfy that intent (e.g., selected and executed via service execution module). Different services may have different capabilities, approaches to working with the user, and in many cases different sources/algorithms from which to pull data. These multiple services may have a flexible degree of connection to query process 10. For example, the services may be part of the domain assistant such that each service may trigger subsequent dedicated service-specific query sub-processes (e.g., using service execution module). The query sub-processes may have a flexible degree of connection to query process 10. In another example, the services (e.g., including service-specific processes) may be loosely coupled, integrated, and/or independent from query process 10 or even specific data sources accessible by query process 10 (and may be executed, e.g., using the service execution module).

In some implementations, query process 10 may have expertise in its understanding/interactivity/capabilities as personified by each service, which may work in concert to deliver a functional experience to the user. An instance of query process 10 may be configured so that a particular service is associated with certain intent classifications and this may be context dependent (e.g., when the user asks about a book, that could be addressed by a service such as a librarian service, when the user asks about a product, that could be addressed by a service such as a shopping service).

In some implementations, to aid in the effectiveness of this process, a model of the intent space may be created. This may be a representation of, e.g., what query process determines may be of use to the user, how the user may approach the knowledge of the domain, what information exists within the domain, and the relationships between the different types of queries and/or actions within the domain. This may be a close match to the knowledge model of the system or require a mapping layer to help bridge an understanding of expectations of users as compared to the knowledge of the world.

In some implementations, query process 10 may identify 302 a plurality of informational items associated with the object. For example, identifying a user's intent may be necessary to satisfy the user's goal, but it may not be sufficient to execute the proper query or for the service to complete the goal. Typically, additional information may be required and this information may be obtained from a variety of sources. Thus, it may be required to identify the required information (e.g., the informational items needed to complete the proper query/service), and obtain this information in an efficient and effective manner. In some implementations, the informational items needed to determine and/or complete the proper query/service workflow may include, e.g., information needed to identify one or more objects (e.g., hammers for a skid steer, transmission for car, buckets for an excavator, etc.), information needed to identify the service and/or the domain associated with the object (e.g., automotive parts).

The identification of the required informational items may occur in multiple ways. For example, each intent usually specifies a set of parameters that are required to fully specify that intent. For instance, the intent of ordering a component such as a part is usually not sufficient unless there is some indication of the part type to be ordered. Similarly, booking a flight may require, at a minimum, knowing the origin and destination cities or airports. Thus, the definition of the intents themselves may identify some of the key informational items needed.

In some implementations, query process 10 may identify 304 at least a first informational item of the plurality of informational items associated with the object for which a first portion of information is already known. For instance, and continuing with the above example, the first informational item (e.g., which machine class such as skid steer class) may be associated with the first portion of information (e.g., skid steer class, model number such as 505*e*, another product ID for skid steer class) to identify the object of the user's query intent (e.g., if the user were to express "I need a new hammer for my skid steer"). Thus, in the example, the first portion of information of the informational item(s) may already be known. In some implementations, the "informational items" (may also be referred to as "required information") are needed for finding appropriate object. For example, what are at least two "informational items" that need to be known to identify a compatible hammer. The "portion of information" is the actual information used for determining the "informational item." The "portion of information" may be essentially the same as "informational item" or may be tangential information that query process 10 may use to identify the "informational item" based on correlations. For example, if the "informational item" is "type of tractor" then either the "portion of information" may be "backhoe loader" (type of tractor) or tangential information, e.g., "model number", which is thus linked to a "backhoe loader". In other words, there may be situations where the information needed (informational item) is the same as what the system has, and/or may also cover other situations where the system does not have the needed information, but has other information tangentially related such that system can identify what information (portion of information) can be used to determine the informational item. As another example, the first portion of information may the same as the first informational item (e.g., first informational item may be a car make/model and first portion of information is Toyota Camry). In another example, the first portion of information may be tangential or indirect information that the query process 10 may use to identify first informational item (e.g., first informational item may be a car model and first portion of information may be a vehicle identification number (VIN), model number, or another identification number that may be used to identify car model). In another example, tangential or indirect information for the first portion of information may refer to correlations (e.g., first informational item may be a car model and first portion of information may be any Toyota car-related information that may be used to identify Toyota Camry as the car model through correlations such as engine type, car class, etc.)

In some implementations, query process 10 may identify 306 at least a second informational item of the plurality of informational items associated with the object for which a second portion of information is unknown. For instance, and continuing with the above example, assume query process 10 has identified the first informational item (e.g., what is the class of machine) and the first portion of information (e.g., what model skid steer). In the example, query process 10 may now need to identify a second information item (e.g., hydraulic power output of machine), which the second portion of information (e.g., hydraulic power output, or whether the skid steer has advanced auxiliary hydraulics) needed to answer this question may be currently unknown. In some implementations, further informational needs may be specified depending on how the intent gets satisfied. For example, when looking for a replacement component or part (e.g., hammer), the solution path may include determining component compatibility with the user's existing system such as equipment (e.g., skid steer). If such a path is taken, there may be a need to identify the existing system configuration (e.g., ask what other work tools may be in the user's possession to determine machine features), which query process 10 may ask a question to determine the unknown second portion of informational. Similar to above, in an example, the second portion of information may be the same as the second informational item (e.g., second informational item may be hydraulic power output of machine and second portion of information may be hydraulic power output which may be a power range). In another example, the second portion of information may be tangential or indirect information that query process 10 may use to determine second informational item (e.g., the second informational item may be hydraulic power output of machine and second portion of information may be whether the skid steer has advanced auxiliary hydraulics or not which may be used to identify hydraulic power output). In another example, tangential information for the second portion of information may refer to more direct information (e.g., second portion of information may be hydraulic power output identification number or some other identification number linked directly to hydraulic power output). As yet another example, the second informational item may be the transmission type of a car (e.g., standard or manual), and the second portion of information may be whether the car has a clutch or not which may be used to identify the transmission type.

In some implementations, an alternative solution path may cause query process to try to identify the appropriate component (or part) based on the intended usage, in which case, determining the usage may become relevant (e.g., farming). Thus, some required informational items may be determined based solely on the intent, while other informational items may only become clear based on the means selected to satisfy that intent.

In some implementations, query process 10 may generate 308 a question to determine the second portion of information based upon, at least in part, the second portion of information being unknown. For example, in some implementations, the question may be one of a direct question and an indirect question to determine the second portion of information. For instance, and continuing with the above example, assuming the second portion of information (e.g., the information needed to answer the question(s) of which tires are compatible with the tractor) is unknown, query process 10 may generate 308 a question to determine this information. In some implementations, the question may be a direct question generated and provided to the user (e.g., "what are the exact tires that you need?" or "what types of tires fit your tractor connector?"). The question is a direct question because the answer being sought is the answer to the second informational item (e.g., which tires are compatible with the tractor) without requiring an inference. In some implementations, the question may be an indirect question generated and provided to the user (e.g., "what is the make/model of your tractor?", "what is the Vehicle Identification Number of your tractor?" or "what is the type of connector used between your tractor tires and the tractor?"). The question is an indirect question because the answer being sought is actually to a different question than the second information item (which tires are compatible with the tractor), but it may be used to determine by inference (e.g., indirectly) the second informational item. For example, by knowing the type of connector between tires and tractor, the domain assistant (e.g., via query process 10) may be able to identify or determine which tires may be compatible with tractor. That is, if the user does not know the answer to the direct question of which tires are compatible with the tractor, query process 10 may generate and ask tangential questions to get the needed information. For example, if the question is "what is the make/model of your tractor?" or "what is the Vehicle Identification Number of your tractor?" or "what is the type of connector used between your tractor tires and the tractor?" query process 10 may request information from the KB that may have a table detailing all the compatible component or parts with a particular make/model of a tractor or its VIN or its type of connector. As such, by asking the particular make/model of a tractor or its VIN or type of connector, query process 10 may indirectly obtain the answer for the second informational item (which tires are compatible with the tractor). Therefore, query process 10 may determine what needed information is missing. Then, ask questions to obtain unknown information (directly or indirectly).

In some implementations, query process 10 may receive 310 an answer for the question generated to determine the second portion of information. For instance, query process 10 (e.g., via UI 500) may generate and provide the question to the user, and the user may use UI 500 to respond to the question, which may be received by query process 10.

In some implementations, query process 10 may determine 314 a sequence of a plurality of questions to be generated. For example, rather than having a rigid conversational workflow, where the same questions are provided to the user in the same specific order to get to the answer, query process 10 may constantly optimize the questions and their order of being provided to minimize what it has available to ask the user. Query process 10 may constantly look for opportunities (e.g., by checking existing records and other information) to avoid having to ask the user questions. That is, unlike some Q&A systems, query process 10 does not use a hard-coded path to a result where a fixed set of tasks are used for a set of fairly rigid conversational workflows to interact with the user to collect needed information and to present results. Instead, query process 10 may look to the KB or other information sources to determine what next question should be asked as it looks at data. This is dynamic in that as data changes, questions may be adapted and thus dialogue with user may be adapted. In some implementations, query process 10 may leverage knowledge of the domain, the users, and context to flexibly and dynamically generate a suite of conversational workflows (at application configuration time) and to modify the path through them at run-time. This may provide a customized and streamlined user experience, avoiding unnecessary interactions and allowing for alternative paths to a solution.

In some implementations, query process 10 may utilize generation of alternative paths based on domain and world knowledge, which may result in a different sequence of questions being generated and provided to the user. As an example, the specific model number for a system component may be determined by the system into which it fits, by the component to which it connects, by the intended usage of that component, or by the components previously ordered by a given customer. Using this knowledge, a workflow may be created that contains all of these alternative paths. Query process 10 may then, at run time, prefer one path over another path based on the ease with which the necessary constraining information may be obtained, the likelihood that the user may know certain things but not others, a particular path having fewer questions than another path, or other heuristics.

In some implementations, the sequence of the plurality of questions to be generated may be determined 314 based upon, at least in part, one of user information and context. For instance, query process 10 may take context (and possibly history of what user has asked before, other information about user, etc.) to come up with next question to ask (rather than step-by-step question/answer on a track). In some implementations, if certain information has already been provided, the domain assistant may follow the path that avoids the need to request any additional information from the user.

In some implementations, regardless of how the informational needs are identified, query process 10 may also determine how it may acquire the necessary information (i.e., the informational items). This may include asking the user, querying data sources, invoking other services, or seeing if it is available in the current context. An example of context-provided information may include information provided as part of the prior conversation with the user (e.g., "I want to buy a heavy-duty bucket for some construction work" contains information about the bucket durability as well as the intended usage). Information about the user's role, location, organization, etc. may also serve to provide the needed information. For instance, the user's current location may be used as the default origination city when booking a flight.

In some implementations, given multiple sources of information, query process may determine the "best" way to obtain that information, taking various factors into account including, but not limited to, cost (in terms of financial cost, time, convenience, etc.), speed, accuracy, likelihood of the source having the information, etc. For example, if an equipment's serial number is needed and query process 10 may find it on an invoice or ask the user, it may recognize that looking up the invoice would be both more convenient (i.e., not bothering to ask the user if not needed) and more likely to yield an accurate answer. Where query process 10 may have access to information that is not definitive or where various conflicting information is available, query process 10 may ask the user to select or confirm the information retrieved, which may be simpler for the user than having to provide the information from scratch.

In some implementations, determining 314 the sequence of the plurality of questions to be generated may include excluding 316 generation of a second question for determining the first portion of information. For example, query process 10 may be dynamically optimized such that query process 10 determines questions needed and the sequence of questions to be asked (e.g., minimizing the number of questions asked) based on context, understanding, and probability that the information is going to be needed. For example, where a standard workflow may normally include steps 1-8 (where each step has a new question), instead of walking through each question in order, query process 10 may jump down to questions 7 and 8 that need to be asked based on system already having answers (from knowledge) to questions (corresponding with steps 1-6) that meet probabilities.

In some implementations, query process 10 may be optimized for best user experience. This may imply aiming at reaching their goal with a minimal workflow. For instance, when dealing with common vs. exception-case scenarios, several strategies may be adopted. For example, assuming that a service needs to provide answers:

1) Workflows may be extended to gather additional information before providing a final unique answer; or
2) Several answers may be given together with conditions under which they apply.

Query process 10 may be able to evaluate and choose between options 1) and 2) depending on several factors, including, e.g., probability of exception-cases, consequences of missing the correct answer, user preference, etc. Thus, if query process understands knowledge of the user and intent of the user, then query process 10 may determine what information is needed to accomplish goal of the user (related to their intent) through iterations. Based upon context, intent, and what comes back from the user may be used by query process 10 to determine whether to proceed with follow-up questions. For instance, information fidelity issues may be optimized (e.g., how much information to include), e.g., regarding buckets that work with European power vs. buckets that work with American power, instead of listing all these buckets, query process 10 may present the user (e.g., via UI 500) with compatible and relevant buckets based on knowledge of user being in America and user system.

In some implementations, the cost of obtaining certain information, especially but not exclusively from the user, may potentially exceed benefit of making a request for it. In such cases, it may be appropriate to default to typical values for that information and present that assumption to the user along with results arising from it. As an example, a certain component may be compatible with all models of a system (e.g., equipment) of a certain type except for one rarely occurring configuration. Rather than asking each user or otherwise trying to determine whether query process 10 has access to that unusual configuration, query process 10 may elect to assume that is not the case, provide the user with the appropriate results (which excludes that unusual configuration), and include a caveat that this answer is not valid if they indeed have that specific configuration. In example cases where query process 10 may be able to confirm whether the exceptional behavior holds, query process 10 may still elect to only validate this as a last step, thus avoiding complications within the more common workflow paths. For instance, if a certain component is not certified for use in California, the configuration service may proceed along the default paths and, as a final step, check the shipping location of the product and flag it if the assumptions made are violated (incorrect).

Query process 10 may provide 312 a response to the intent relating to the query based upon, at least in part, at least the first informational item for which the first portion of information is already known and the answer for the question generated to determine the second portion of information. For instance, as noted above, query process 10 may use UI 500 to assist the user through the workflow to fulfill their goal and obtain the required information. As such, based upon already knowing the first portion of information (e.g., engine type) thus knowing first informational item (e.g., type of tractor) and the answer to the second portion of information needed to answer second informational item (e.g., the second portion of information needed to answer the question(s) of which tires are compatible with the tractor, such second portion of information may be type of connector between tires and tractor, make/model of the tractor), query process 10 may optimize the workflow to determine which questions are necessary to ask the user, and which may be skipped or retrieved by query process 10 without asking the user, and then provide a response to the intent relating the query (e.g., the desire to purchase new tires for a particular tractor), which may include the specific tires needed for the user's tractor, the ability to purchase the tires (e.g., via UI 500 or another process/website, etc.).

Thus, as described throughout, one example goal of query process 10 may be to recognize the user's intent, and then to invoke the appropriate action (e.g., execute a service) or information request and provide an appropriate response. How the intent is interpreted, what the correct action or query to invoke is, what the response should be, and how the response should be presented may all vary based on the user, the current task context, the discourse context, and world state. In some implementations, if query process has a model of these intents, actions, users, and domains, it may modify its behavior and/or workflow accordingly. For example, the same user utterance (speech, text, or other interactions) may be interpreted to mean different intents in different contexts. The same intent may be satisfied via different actions or queries in different contexts. The same query may result in different responses and each response may be presented differently in different contexts through use of query process 10. This ability to use modeled knowledge to customize query process 10's behavior may be one example characteristic that may distinguish it from simpler action/response chatbots.

In some implementations, query process 10 may identify 318 a service for a second object associated with the object and query process 10 may generate 320 one or more additional questions associated with the service. For instance, query process 10 may determine whether other services are applicable based on the above-noted response. For example, since query process 10 is now aware that the user has a tractor, query process 10 may identify 318 a particular service (e.g., insurance service) that may be useful to the user. For instance, in the example, assuming the user intent/goal is to buy a component (e.g., tires) for the tractor, query process 10 may run a configurator service (e.g., find the correct component), which may be one of several services that query process 10 may select. After query process 10 fulfills the original intent goal by running the configurator service, query process 10 may determine what other services may be useful and relevant to user. For example, query process 10 may help user buy the tires, and then query process 10 may also determine that user could use another service such as an "insurance" service for extending their insurance (e.g., generating and providing additional questions such as, "do you want to extend insurance?"). Another example service may be a maintenance monitoring service, a recommendation sales service (e.g., recommendation for increasing sales), etc. Whether or not query process 10 triggers a service may be based on information encoded in the above-noted database (or otherwise) and based on user information (e.g., user preferences or context in which user is using application). Query process 10 may be encoded such that several services may be linked together and triggered (e.g., when the insurance service is triggered the maintenance monitoring service may also be triggered).

In some implementations, as described above, query process 10 may select an appropriate service to satisfy the user's intent. In this example, the configurator service may be selected as the appropriate service. The configuration service (also referred to as component selection service, configurator, or component selector) may be a software application that may assist with identifying/selecting a component that belongs to and is compatible with a tractor (or other system) and its possible configurations. This software application (which may be a component of query process 10) may provide a query or may be part of a separate service-specific query sub-process service (e.g., configuration query sub-process). Generally, the configurator service may be responsible for understanding and assisting processes centered around searching through a potential set of components and finding the best component that matches a user's intent, when there exist the example elements of:

Search results may be compatible with the user's system of interest;

User's intended use may restrict potential matches;

User may have further conditions to place upon the search results; and/or

Knowledge model may include various types of information to support the assessment of system/component compatibility.

These categories of information are shown in the table below and may include, e.g.,

| | |
|---|---|
| System and Component Class Organization | Systems may be organized into hierarchies that may be functional or based on marketing need (meaning the organization of the classes may not be ontologically logical but serve a marketing vs a functional goal). A user may specify things at any level of specificity, so query process 10 may need to be able to adapt to the user's description if possible, as the user may reference a marketing understanding of the system as opposed to its correct technical term. Components (e.g., parts) may be similarly organized into their own hierarchies. Examples may include, e.g.,: Engine Parts, Buckets, Worktools, Accessories, Drive Train, Memory Systems, etc. |
| System and Component Identifiers | Systems and components typically have a standard or typical nomenclature for referencing them. For vehicles, this may be Make/Model/Year. For Heavy Equipment this may be a model number, or family of equipment. Multiple naming methods may exist (e.g., model number, family, generation, product family, etc.) A naming system for components may be scoped to the component class. Examples may include: High Octane as a fuel type, a Heavy Duty Bucket as a type of bucket, etc. |
| System and Component Specification Models | Various properties may be used to describe specific classes of systems or components. These may apply to general categories of components, e.g., all physical objects may have a width, height, weight, etc. or to progressively more specific classes. Manufactured objects may have a manufacture, SKU, list price, etc. Computers may have a specific chipset, screen resolution, etc. These system/component properties provide fodder for compatibility decisions. |
| Compatibility Models | System/component compatibility may be specified explicitly (e.g., as a table of what components work with which systems), via constraints on properties specified in the System/Component Specification Models (e.g., a clutch may be dependent upon a car's Transmission Ring Gear Count and the Shifter Placement Style), or via real-world constraints (e.g., a water-craft may not be appropriate for a land-based operation). The Compatibility Models are where such constraints may be defined. |

Once a user's intent, or an opportunity to proactively contact the user has been determined by query process 10 to require identification of compatible components to the user, query process 10 may have a process for determining how to pick which components are valid ones to provide. For example, in order to state the compatibility question formally, whether issued interactively or determined proactively, the following example information types to break down the query in the table below may be declared:

| Info Type | Meaning | Examples |
|---|---|---|
| System Identifier | Which system are we talking about? Within a domain this identifies a specific system instance or type. | Microsoft, Excavator, Bull Dozer, Car, Ford Mustang, Ford Mustang 1977, Internet Information Server, MySQL |
| System Identification Type | System Identifiers are usually typed in some way; We know that "Microsoft" is a Company Name, "Ford Mustang" is "Make/Model". Systems may have different ways to identify them, so System Identification types and Systems are not necessarily one to one. | Model Number, Year/Make/Model, Product Number, Product Class, Product Type, Equipment Type, Plan Name, Product Name |
| System Descriptor(s) | Optional Information that may help, after knowing the system, pick from the possible instantiations of this system in a meaningful way. | A named configuration such as C-Corp/LLC, or Heavy Duty, "Lowered" (Referring to Suspension) |
| Component Identifier | Identify which, of the possible components (or component types) trying to be located. It may be an indicator of what the user is "looking for" that may be usable with what the user "has" (their system) | Engine, Plugin, DLL, Transmission Fuel, Clutch Disk |
| Component Descriptor(s) | Further descriptive information that, once some or all components are known that match the identifier, will help indicate the one being looked for. These are general properties/classifications to help talk about/identify components descriptively. | Carbureted |

Examples: "I'm looking for Organic Clutch Disks for my Ford Mustang 1977," "I have a heavy-duty jack hammer, do you have any 6" extension bits?" "I need a standard duty bucket for my 505E long reach."

Other Examples of Components/System Relationships may include, e.g., Tires (components) for Cars (systems), Buckets (components) for Heavy Equipment (systems), Valves (components) for Hydraulic Pum+ps (systems), etc. The component the user is looking for may be in this top-level partition. Components may serve many purposes, e.g., be upgrades, original equipment manufacturer (OEM) replacements, accessories, etc.

Figure 6:
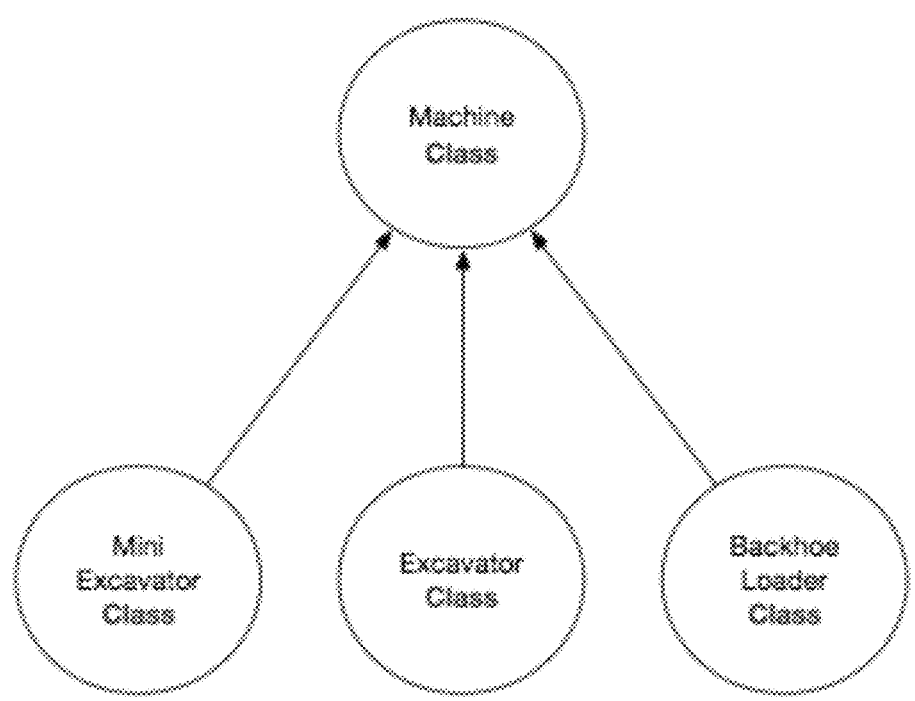
FIG. 6 is an example diagrammatic view of a graph according to one or more example implementations of the disclosure.

In some implementations, and referring at least to the example implementation of FIG. 6, given a representation of the possible space of systems represented as Classes, by way of example, a sample graph 600 representing Heavy Equipment (Machines) is provided, e.g., a hierarchy of Machine types.

Figure 7:
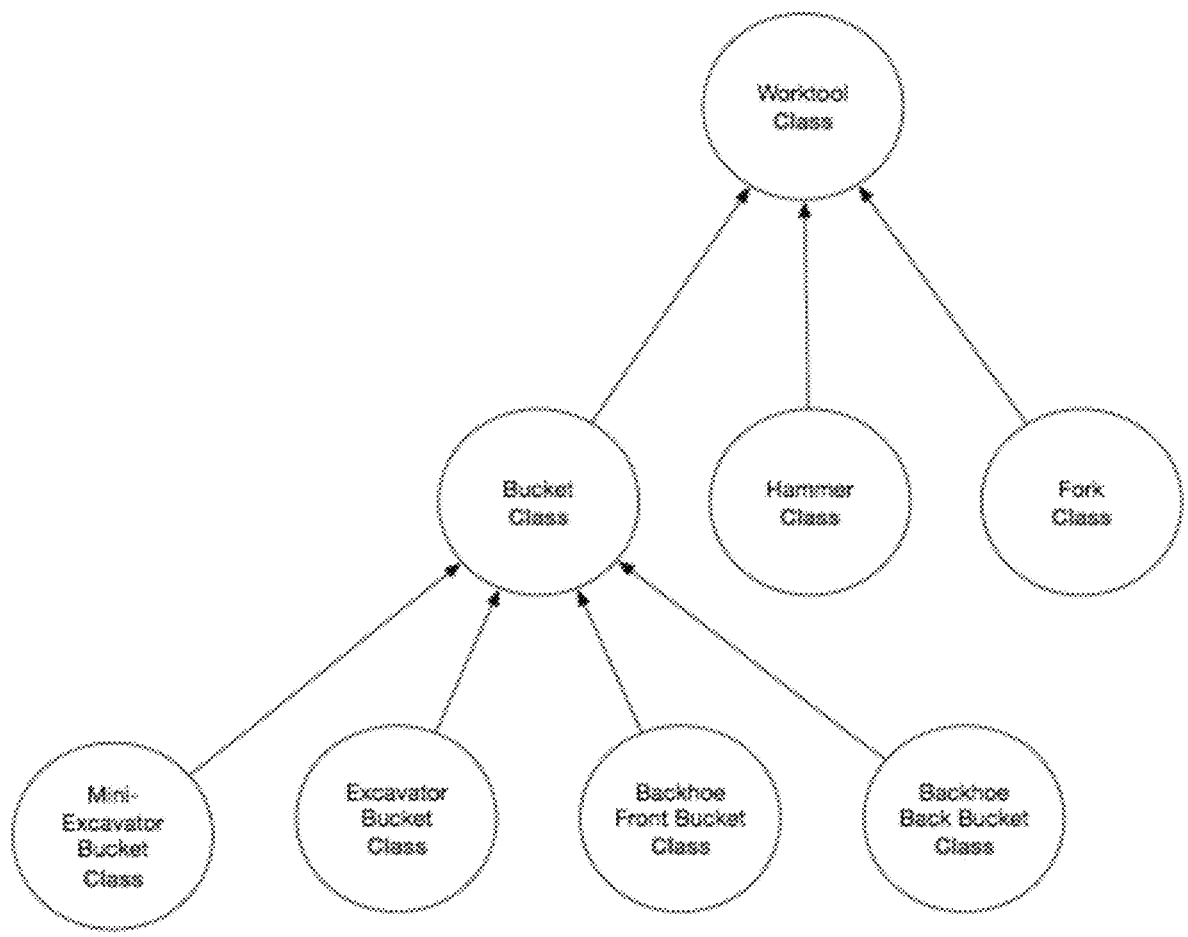
FIG. 7 is an example diagrammatic view of a graph according to one or more example implementations of the disclosure.

In some implementations, and referring at least to the example implementation of FIG. 7, of the potential components of these systems, the configurator service (which may be executed by at least a portion of query process 10) may focus on Worktools as shown in the sample graph 700. In the example, a user may seek individual, specific, tools (e.g., buckets) to use with their machine.

Figure 8:
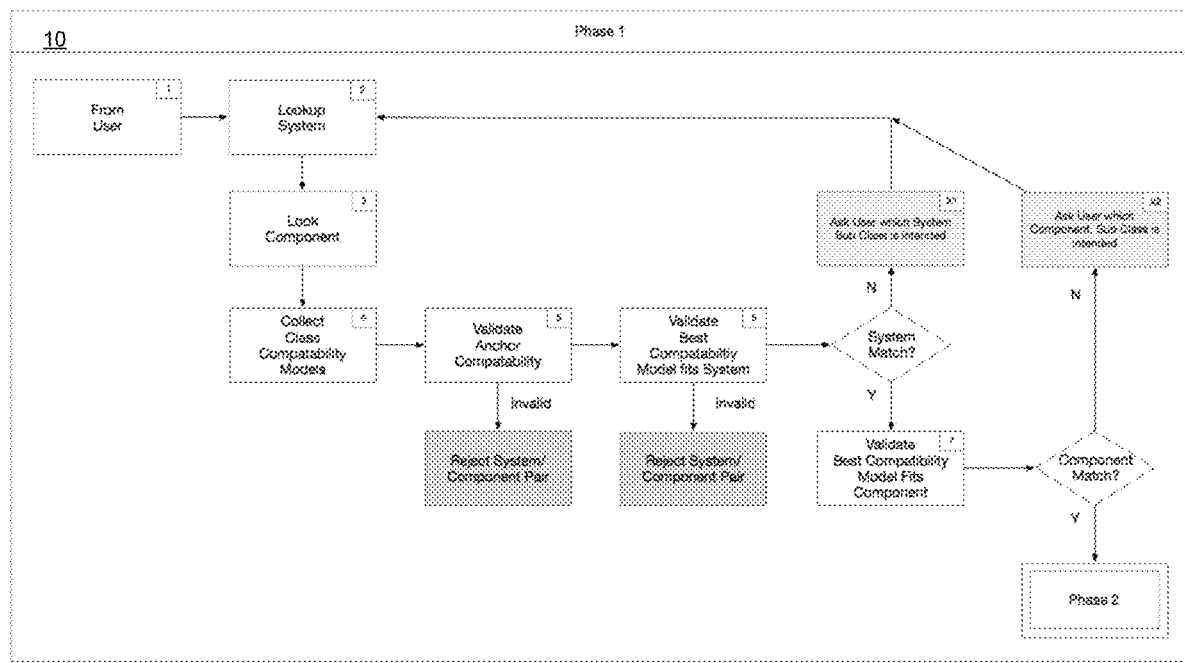
FIG. 8 is an example flowchart of a query process according to one or more example implementations of the disclosure.
Figure 9:
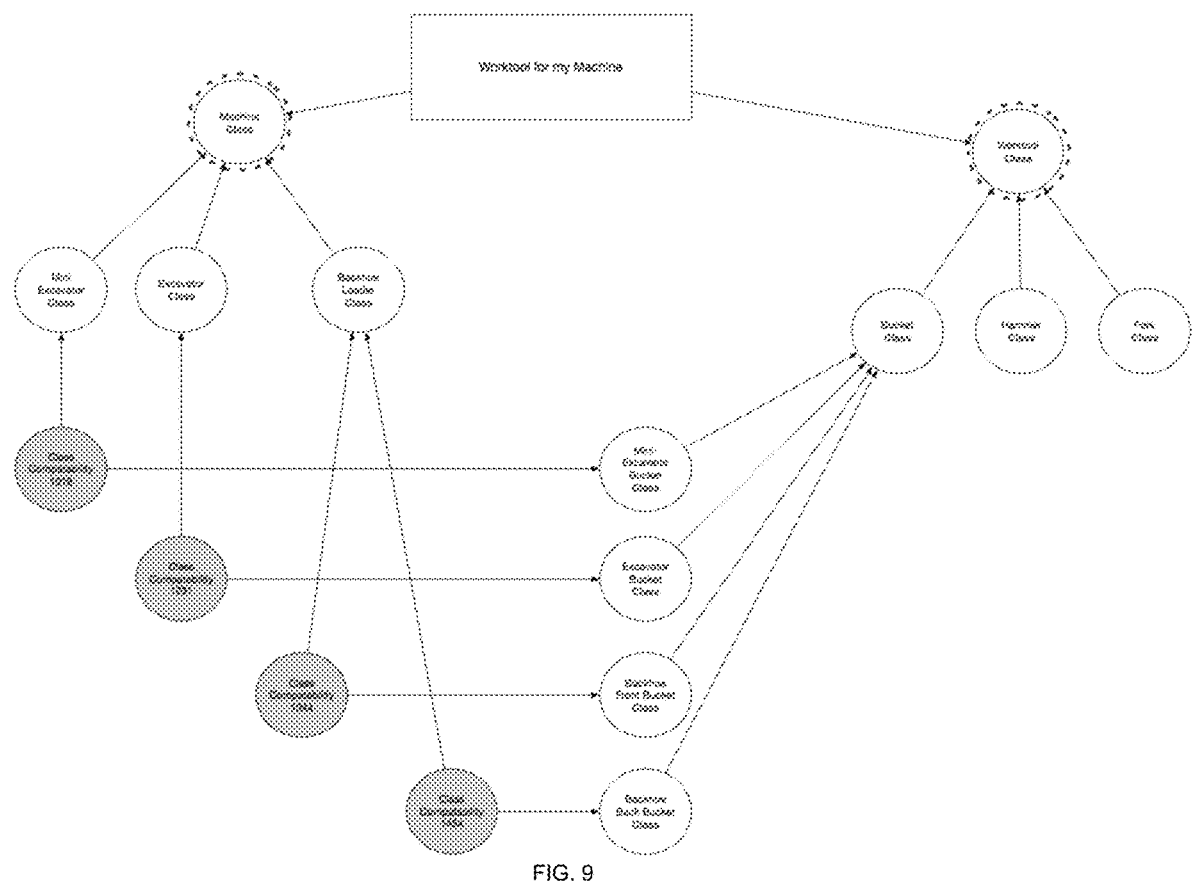
FIG. 9 is an example diagrammatic view of a graph according to one or more example implementations of the disclosure.
Figure 10:
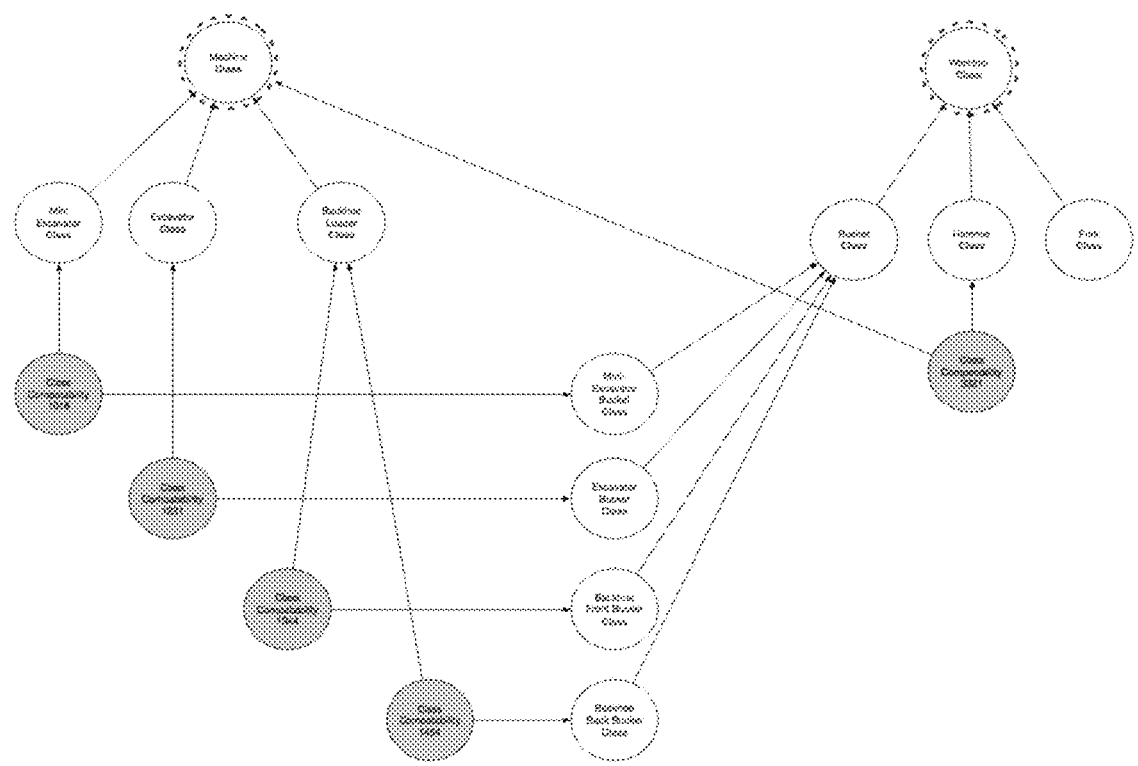
FIG. 10 is an example diagrammatic view of a graph according to one or more example implementations of the disclosure.

Referring at least to the example implementation of FIG. 8, an example flowchart executed by query process 10 that may be used to guide the user and optimize the questions needed to be presented to the user is shown. As noted above, query process may try to produce results as soon as possible and only ask questions if it fundamentally changes the results.

Phase 1— Identify Which Class Compatibility Model Being Operating Under

As the Class Compatibility Model (e.g., via query process 10) determines whether the pairing is even possible (e.g., whether there exists a component compatible with the described system), query process 10 may need to find the best model that matches the users request. In some examples, the user's request may not be possible: e.g., "Are there any excavators at Microsoft that know Java?"

Step 1— From User

As noted above, the relevant system of interest may be explicitly stated in the query or extracted from the user information in the knowledge graph, a local database, or in another data source.

Step 2— Lookup System

In some implementations, the user's system descriptor may need to be classified, labelled with the most specific class to which the descriptor belongs. This may be done through, e.g., natural language processing (NLP) training, lookup in a local/remote database, or cached in the Knowledge Graph/Knowledge Base. The Class node may need to be located with the Knowledge Graph for the algorithm to continue, as the domain assistant may operate on these relationships to proceed.

Step 3— Lookup Component

Component lookup may follow the same concept as System lookup. Query process 10 may proceed if the Component Class is identifiable, within the context of the System in case the identifier is ambiguous.

Step 4— Collect Class Compatibility Models

Next, query process 10 may produce a set of some or all Compatibility Model Nodes (or Facts) that represent the existence of compatibility data between two classes and the conditions upon which compatibility must be evaluated. For example, and referring at least to the example graph 900 of FIG. 9, the search for "Worktools for my Machine" has four Class Compatibility nodes that link to descendants of Worktool and Machine.

Step 5— Validate Anchor Compatibility

By convention, top level compatibility may be encoded into a model (e.g., as a class general statement). This may refer to class statements such as "Machines take Worktools", etc. If such a model includes these Anchor statements, query process 10 may validate this as part of the algorithm. This may allow rejection of such statements as "Which Engines have Employees?" as being semantically incorrect.

Step 6— Validate Best Compatibility Model Fits System

Query process 10 may look to a candidate set for nodes related to the System identifier first. If a direct relationship is not found, but one is found in the descendants, query process 10 may ask the user to clarify (step X1). If a system match is found, then process initiates validation of component compatibility at step 7.

Example: Mini Hex->Bucket, No issue, go to Step 7.
Example: Machine->Hammer, No Issue, go to Step 7.
Example: Machine->Bucket, Must clarify Machine Class descendant, go to step X1.

Step X1— Ask User

Referring at least to the example graph 1000, the user may be presented with potential descendants visually, but may accept any descriptor in the tree and then may return to step 1 to re-evaluate the query. Step X1 may involve asking of user which system sub class is intended.

Step 7— Validate Best Compatibility Model Fits Component

Step 7 may involve same process as Step 6, but following the Component side. Step 7 may provide validation of component compatibility in terms of validating best compatibility model for fitting component. If no match, then process initiates step X2. If match, then process starts phase 2.

Step X2— Ask User

Same process as step X1 but instead relates to component instead of system. Step X2 may involve asking of user which component sub class is intended. Again, referring at least to the example graph 1000, the user may be presented with potential descendants visually, but may accept any descriptor in the tree and then may return to step 1 to re-evaluate the query.

Phase 2— Utilize Class Compatibility Model

Figure 11:
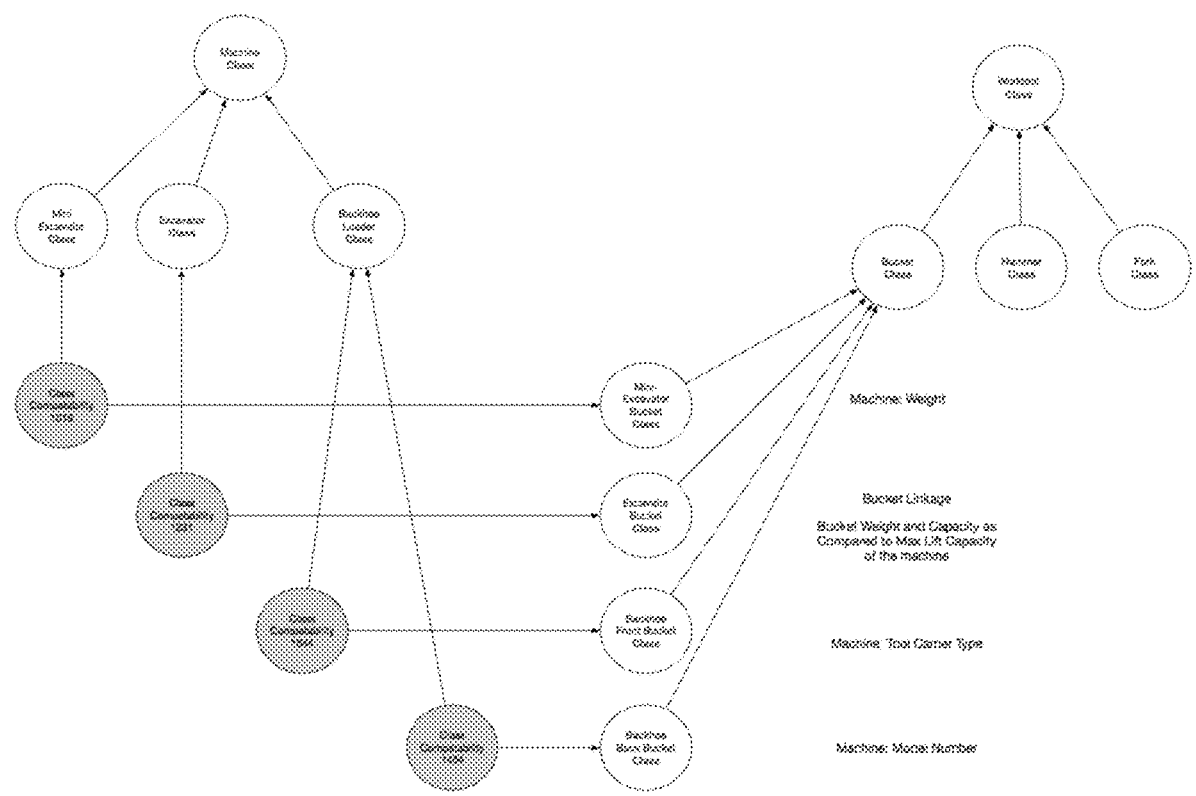
FIG. 11 is an example diagrammatic view of a graph according to one or more example implementations of the disclosure.

A class compatibility model may relate to defining that two classes have a compatibility relationship and describe what factors match between System and Component to drive compatibility. Another incarnation of this concept is the schema for compatibility nodes within a graph. From the compatibility model, query process 10 may determine which descriptors (system or component) may need to be inquired upon. The example graph 1100 of FIG. 11 provides annotations by way of explanation:

Mini-Excavator Buckets depend on Machine Weight.

Excavator Buckets Depend on Linkage and Bucket Weight/Capacity Compared to Lift Capacity of Machine.

Backhoe Front Buckets depend on the Tool Carrier Type (e.g., Feature).

Backhoe Back Bucket depends on Model Number.

In some implementations, the sequence of the plurality of questions to be generated may be determined 314 based upon, at least in part, a probability that the second portion of information is needed to provide the response to the query. For example, annotations in the graph regarding what the user may or may not know may allow an adaptive model (e.g., via query process 10) to ask indirect questions in satisfaction of this goal. For example, asking the user for a "machine Weight" may be marked as a low probability field, but asking for a model number, which is highly knowable, may provide the domain assistant the "machine weight" directly. In addition, from a possible set of direct compatibility relations and inferred alternative means of satisfying these relations, the adaptive domain assistant system may decide to take a known factor and instead of asking the user, may merely note it.

For example, a compatibility factor of "stick length" may affect less than 5% of the components (meaning it only makes a difference in 5% of the components that would match if you relax this constraint) so instead of asking the user "stick length", query process 10 may note the requirement on matching parts.

For example, some exhaust parts do not comply with California regulations. Rather than asking every user if they reside in California (assuming this isn't known to query process 10), query process 10 may evaluate that California is just 1 of 50 states so has a low probability of being relevant. Instead the state regulation warning may become an annotation rather than a requirement.

In general, from a population of possible components (e.g., Buckets or Clutches), there are those that are "compatible" with specific systems (e.g., machines), but it is usually an indirect relationship. In some examples, relationship may be simplified to whether a component may work with system (e.g., bucket X (component) may work with machine Y (system)).

As another example, a clutch (component) may be compatible with a 1967 Shelby Mustang (system) based on one or more of the following four example elements that drive compatibility:

The number of ring gear teeth;

The spline size;

The horsepower requirement; and/or

The Placement of the shifter;

Thus, for a clutch (component) to be compatible with a car (system), at least one or more of the following example four elements should be met:

It should have the matching number of ring gear teeth;

It should match the spline size;

Its engine should not exceed the horsepower requirement; and/or

It should have any special shifter requirements.

In another example, instead of asking a question, since query process 10 may know information is needed in the selection criteria, query process 10 may decide whether or not a question subdivides a set large enough to warrant the risk of asking a question. For example, query process 10 may ask or provide a table with a conditional item depending on risks based on percentage of exception and consequence of the exception.

It will be appreciated that in some implementations, query process 10 may generate 308 the answer for the question from a virtual agent. For example, similar to a "Virtual Sales Assistant for Component Selection" interface, query process 10 may be executed using virtual agent technology. The user interface of this system (e.g., UI 500) may be conversational in nature and may demonstrate component selection, content navigation and delivery, sales ordering, and reporting. The example virtual agent may be designed to be scalable over time as more parts (e.g., hammers), new machine models, additional content, and additional dealers are added, to serve as the most efficient and effective Virtual Sales Assistant (or other interactive interface). The example virtual agent may be hosted securely on other web services, may use an English-language only (or other language), may use conversational (combination of machine learning, natural dialog and navigational hints, etc.) user interface, may allow for faster and correct component selection for the list of company provided makes/models of the excavator product family (e.g., 123A B, 456A B, 123C D, 456C D, 789E F, etc.), may enable making recommendations, may place an order and/or capture the lead for selected component through a sales representative, may report sales of components (e.g., buckets), and may publish field sales data to a company designated web portal (or otherwise), discovering, navigating, and/or delivering relevant content from company provided content, including technical description, marketing brochures, and commercial training, identifying what content would be public, and what would be gated and the appropriate delivery mechanisms, identifying coaching needs for sales reps based on, e.g., testing using a select number of conversations/component-selection flows, controlling data access (e.g., provisioning and revocation may comply with security specifications), generating usage data, including for example, a daily performance report, which may be analyzed and utilized to understand its sales strategy, Critical Success Factors (CSFs), Key Performance Indicators (KPIs) and customer buying behavior, performance data, history of questions asked by a user, answers provided, navigational decisions by questions, log data including, e.g., where and when accessed, and session length, providing voice support under mobile native application.

In some implementations, the query process 10 may be integrated with an example domain assistant system. The domain assistant system may identify an intent relating to a user's goal based on events (e.g., user requests, database triggering event based on criteria, etc.). The domain assistant system may then determine at least one service relating to the goal/intent and then run or execute the service(s) to fulfill the goal/intent.

As described above, the domain assistant system may utilize virtual agent technology to accomplish objectives (e.g., fulfill goals/intents) through the following services:

The configuration service (also referred to as component selection service, configurator, or component selector) may be a software application that can assist with identifying/selecting a component that belongs to and is compatible with a system and its possible configurations. Component Selection may include providing a multi-step process for identifying the compatible components (e.g., attachments) that will fit into a system with a specific configuration.

This can be accomplished when the user describes the system in question or has the system work with the user to extract system specifications needed in order to narrow the possible components available to those that are compatible with the system in its described configuration.

The Sales Representative Training Service may provide ability to train/test knowledge of sales representatives on selling components (e.g., buckets). The Sales Representative Training Service may provide means to discover and access appropriate technical information, marketing, and commercial training materials (e.g., train sales based on multiple files). The Sales Representative Training Service may provide motivational content and recommendations for increasing sales of components (e.g., buckets), allow faster and correct component selection for list of company provided production models (e.g., excavator models), capture lead and place order for selected component through sales representative, and report sales of components to a spreadsheet or company provided system.

The user interface for the domain assistant system may be conversational in nature and may demonstrate component selection (e.g., for configurator service) as well as delivery of supportive services such as content navigation & delivery, sales ordering, and reporting. Some functionalities of this system may include guiding users through the configuration service process, taking voice notes, encoding customers' answers via clicks, and converting all relevant information into facts. Two scenarios that may considered for this invention include:

Live: Sales staff may use the application of the domain assistant while on the phone with a potential customer or in person; and Offline: All the details about customer preferences/job requirements are already available/known to user who can use the application without the customer present to generate a proposal.

The domain assistant may be able to understand multiple intents that may be understood simultaneously. The domain assistant may generate usage data that may include a daily performance report that can be analyzed & utilized to understand its sales strategy, customer buying behavior, etc. The domain assistant may be used to obtain pricing and inventory information for products as well as supplement information from cached and/or remote sources.

The domain assistant may include a query engine (e.g., conversation query manager (CQM)). The domain assistant may provide a combination of inputs (e.g., selection) by way of voice, click, swipe, text chat, etc. The domain assistant may allow you to start and stop dialogue at different stages and then come back to these same dialogues at a future time.

Live: Sales staff may use the application of the domain assistant while on the phone with a potential customer or in person; and Offline: All the details about customer preferences/job requirements are already available/known to user who can use the application without the customer present to generate a proposal.

The domain assistant may be able to understand multiple intents that may be understood simultaneously. The domain assistant may generate usage data that may include a daily performance report that can be analyzed & utilized to understand its sales strategy, customer buying behavior, etc. The domain assistant may be used to obtain pricing and inventory information for products as well as supplement information from cached and/or remote sources.

The domain assistant may include a query engine (e.g., conversation query manager (CQM)). The domain assistant may provide a combination of inputs (e.g., selection) by way of voice, click, swipe, text chat, etc. The domain assistant may allow you to start and stop dialogue at different stages and then come back to these same dialogues at a future time.

Figure 12:
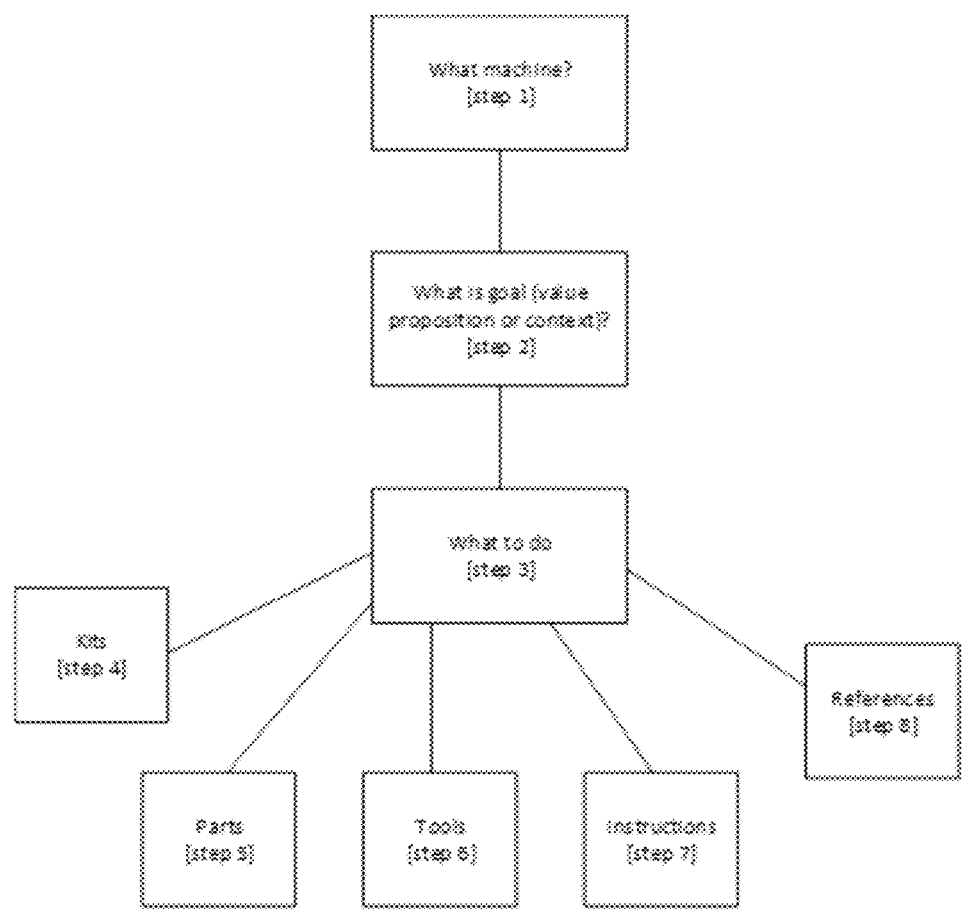
FIG. 12 is an example flowchart of a query process according to one or more example implementations of the disclosure.

A domain assistant may use query process 10 (and/or may be a component of query process 10) that may be applied to a variety of fields and relate to various value propositions. In some implementations, and referring at least to the example implementation of FIG. 12, an example workflow 1200 of an example domain assistant is shown that may be used by query process 10.:

At steps 1 and 2, domain assistant identifies intent and subject system (e.g., machine) from intent e.g., domain assistant identifies intent such as what is machine (step 1) and what is user trying to do (step 2). Then, domain assistant may go to next steps in process. Steps 1 and 2 may be used to identify what user is talking about topically and value proposition user is trying to accomplish.

At step 3, domain assistant may determine one or more services to suggest to user with respect to intent and then proceed to execute one or more of the services that user agrees to being executed (e.g., execution of one or more of following steps triggering services: step 4 (kits service), step 5 (configurator or parts service), step 6 (tools service-give user tools), and step 7 (instructions service—give user instructions).

In summary, the domain assistant system may determine what is the problem, what is the value proposition, and then the system may communicate what to do (e.g., here is what user needs to buy, know, or obtain). System provides total solution for user.

For example, there is a need to disassemble engine domain assistant may provide instructions, tools, parts (which may all be sold to user) regarding disassembly of engine. In another example, machine is broken (step 1—system identified as machine) and domain assistant may identify from intent what user is trying to do (step 2). Then, domain assistant may respond with what should be done in terms of service(s) (step 3) e.g., what may be available in terms of kits (step 4) and then may get user the parts/tools/instructions (via steps 5-7).

Domain assistant system may also provide references at step 8 (e.g., videos, tips, read up on it, people that did this process also found this process useful, here is what our top experts say about issue, other people with your problem have also found X helpful, etc.).

As an end-to-end, this example methodology provides a workflow that may applied to any component (e.g., equipment) or any system (e.g., machine).

In an example, domain assistant system may identify an intent by e.g., determining a problem (1) and determining a user goal (2). Domain assistant may then determine what to do (step 3) and then may execute one or more of the following services as shown in flow chart above: find relevant kits (step 4), find relevant parts (step 5), find relevant tools (step 6), find relevant instructions (step 7), and/or find relevant references (step 8). Providing customer a part or component may not be sufficient in satisfying all of the user's goals. Thus, other tangential services may be initiated such as services at step 7 and step 8 (e.g., user may need instructions and references as well related to part or component identified in configuration service). Later steps (i.e., steps 4-8) are examples of services that can be executed to help user that may cover a variety of actions. Domain assistant may provide data management & availability such as query technical information and publications (both structured and unstructured data).

Below is a summary of each step with examples:

Step 1. What machine? (e.g., what is it? or what are you fixing?)

Example Answers may include but are not limited to following: Model of machine→provided by user making the inquiry, Serial # of machine, Description of machine e.g. compact track loader, HP printer, etc.

Step 2. What is the user's goal? (e.g., what is user trying to do?) The goal may relate to fulfilling a specific service (e.g., configuration service). The goal may be determined from goal-oriented dialogs and/or from other user information. Goal categories may include but are not limited to following examples: sales opportunity (e.g., trying to buy a part), customer engagement tool (e.g., trying to find out that user equipment is going to break such that a notification from a predictive engine states that the probability of the machine breaking is high and user should maintain it), retail (e.g., user on a website that wants to buy equipment to build airplanes, customer that wants to buy a bucket, etc.), Do-It-Yourself (DIY) (e.g., trying to change your printer ink), etc. Goal may be determined from value proposition (e.g., context). Examples of value propositions that may be provided through a service may include but are not limited to the following:

Repair Indicator (need repair)→may be pulled from company data.

Insurance (need to get component or device certified)→may be pulled from data of Business Unit, Sales Team, Financial Services, etc.

Certified Product→may be pulled from data of sales opportunity

Preventive Maintenance→may be pulled from data of company platform (e.g., Symphony platform)

Responding to sale/promotion→may be pulled from data of business unit, sales representatives, retail, sales team, etc.

New sale (e.g., buy new machine)→may be pulled from data of dealer representative selling parts or attachments to fix a problem Installation e.g., part arrived but user does not know how to install it Compatibility Check e.g., trying to determine if user has the compatible part to do a repair Step 3. What Services to Run or Execute Based on goal within user intent, domain assistant may identify which service or services should be executed to accomplish goal. Then, steps 4-8 may be selected accordingly.

Step 4. Find and Determine Relevant Kits Service

Example kits may include but are not limited to: Foundational Kits (Top End Kits, Major Overhaul Kits), procedure kits, parts kits, etc. Kits service may provide a prefabricated solution that can be bundled or combined. Kits service may give instructions and internet data. Other examples of kit service may include but are not limited to following: Marketing Promo's (e.g., kits written by someone in marketing), dealer-defined kits, kits enabled in a parts website, etc.

Step 5. Find and Determine Relevant Configuration Service (e.g., Parts Service)

The configuration service (e.g., parts service) may list price, dealer price, inventory, shipping, promotion, on sale, etc. Examples of parts service may include but are not limited to the following: compatible parts lists from a company team, original parts list from organization, builder (mined) for incomplete compatible parts, Dealer Database (needs integration model) for incomplete compatible parts, company parts website, etc.

Step 6. Find and Determine Relevant Tools Service

Examples may include but are not limited to the following: Builder-defined tools (e.g., manually created) from company team, Parts or tools listed on company website, etc.

Step 7. Find and Determine Relevant Instructions Service

Examples may include but are not limited to the following: Approved Company Instructions→e.g., derived from search or query and becomes a fixed formula for this particular service, Dealer technician Notes e.g., based on best search results, etc.

Step 8. Find and Determine Relevant References Service

Examples may include but are not limited to the following: Videos, Tips, Best search results, Advice/Best Practices, etc.

For instance, assume for example purposes only that an HP printer is out of ink. In this example, the domain assistant system may respond with procedures (e.g., check to see if it is plugged in, run ink test to see what colors are low) or domain assistant may respond with diagnostic or domain assistant may tell user about performance statistics, etc. Domain assistant may also assist with fixing a printer by providing executing services related to parts, instructions, etc.

As another instance, assume for example purposes only that a hydraulic excavator is the machine the user needs to excavate a mountain. Domain assistant system may ask user questions about what type of material (e.g., is it iron ore or dirt?). For example, if iron ore is selected, domain assistant may determine components that can be used for excavating iron ore from mountain and then offer and sell these components to user.

As another instance, assume for example purposes only that in order to obtain insurance, component or machine may need to be company certified. This service may be used to for determining how to get machine certified. For example, the machine may have to comply with certification rules (e.g., need to have bought right parts, need to have followed official instructions each time you changed the oil, cannot have non-company parts, etc.) otherwise not eligible. Domain assistant may use insurance service to help user obtain applicable insurance by guiding user.

As another instance, assume for example purposes only that there is a preventative maintenance service. There may be data sources within a company or organization (e.g., enterprise data) that can be used by preventative maintenance service in providing preventative maintenance information. For example, user has hydraulic excavator and is concerned about preventative maintenance. The domain assistant may use preventative maintenance service to monitor company databases and then instruct user accordingly (e.g., give user procedures and then tell user what to do next in terms of maintenance through life of vehicle).

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   identifying, by a computing device, an intent relating to a query associated with an object;
   identifying a plurality of informational items associated with the object;
   identifying at least a first informational item of the plurality of informational items associated with the object for which a first portion of information is already known;
   determining a sequence of a plurality of questions to be generated for a conversational workflow, wherein determining the sequence of the plurality of questions to be generated includes excluding generation of a second question for determining the first portion of information;
   identifying at least a second informational item of the plurality of informational items associated with the object for which a second portion of information is unknown;
   generating a question to determine the second portion of information based upon, at least in part, the second portion of information being unknown, wherein the question is part of the conversational workflow that is dynamically generated based upon, at least in part, at least the second informational item;
   receiving an answer for the question generated to determine the second portion of information; and
   providing a response to the intent relating to the query based upon, at least in part, at least the first informational item for which the first portion of information is already known and the answer for the question generated to determine the second portion of information.

2. The computer-implemented method of claim 1 wherein the answer for the question is generated from a virtual agent.

3. The computer-implemented method of claim 1 wherein the second portion of information is determined by inference based upon, at least in part, the answer for the question.

4. The computer-implemented method of claim 1 wherein the sequence of the plurality of questions to be generated is determined based upon, at least in part, one of user information and context.

5. The computer-implemented method of claim 1 wherein the sequence of the plurality of questions to be generated is determined based upon, at least in part, a probability that the second portion of information is needed to provide the response to the query.

6. The computer-implemented method of claim 1 wherein the second portion of information is absent from the answer for the question.

7. The computer-implemented method of claim 1 further comprising:
   identifying a service for a second object associated with the object; and
   generating one or more additional questions associated with the service.

8. The computer-implemented method of claim 1 wherein the question is one of a direct question and an indirect question to determine the second portion of information.

9. A computer program product residing on a non-transitory computer readable storage medium having a plurality of instructions stored thereon which, when executed across one or more processors, causes at least a portion of the one or more processors to perform operations comprising:
   identifying an intent relating to a query associated with an object;
   identifying a plurality of informational items associated with the object;
   identifying at least a first informational item of the plurality of informational items associated with the object for which a first portion of information is already known;
   determining a sequence of a plurality of questions to be generated for a conversational workflow, wherein determining the sequence of the plurality of questions to be generated includes excluding generation of a second question for determining the first portion of information;
   identifying at least a second informational item of the plurality of informational items associated with the object for which a second portion of information is unknown;

generating a question to determine the second portion of information based upon, at least in part, the second portion of information being unknown, wherein the question is part of the conversational workflow that is dynamically generated based upon, at least in part, at least the second informational item;

receiving an answer for the question generated to determine the second portion of information; and providing a response to the intent relating to the query based upon, at least in part, at least the first informational item for which the first portion of information is already known and the answer for the question generated to determine the second portion of information.

10. The computer program product of claim 9 wherein the second portion of information is determined by inference based upon, at least in part, the answer for the question.

11. The computer program product of claim 9 wherein the sequence of the plurality of questions to be generated is determined based upon, at least in part, one of user information, context, and a probability that the second portion of information is needed to provide the response to the query.

12. The computer program product of claim 9 wherein the second portion of information is absent from the answer for the question.

13. The computer program product of claim 9 wherein the operations further comprise:
  identifying a service for a second object associated with the object; and
  generating one or more additional questions associated with the service.

14. The computer program product of claim 9 wherein the question is one of a direct question and an indirect question to determine the second portion of information.

15. A computing system including one or more processors and one or more memories configured to perform operations comprising:
  identifying an intent relating to a query associated with an object;
  identifying a plurality of informational items associated with the object;
  identifying at least a first informational item of the plurality of informational items associated with the object for which a first portion of information is already known;
  determining a sequence of a plurality of questions to be generated for a conversational workflow, wherein determining the sequence of the plurality of questions to be generated includes excluding generation of a second question for determining the first portion of information;
  identifying at least a second informational item of the plurality of informational items associated with the object for which a second portion of information is unknown;
  generating a question to determine the second portion of information based upon, at least in part, the second portion of information being unknown, wherein the question is part of the conversational workflow that is dynamically generated based upon, at least in part, at least the second informational item;
  receiving an answer for the question generated to determine the second portion of information; and
  providing a response to the intent relating to the query based upon, at least in part, at least the first informational item for which the first portion of information is already known and the answer for the question generated to determine the second portion of information.

16. The computing system of claim 15 wherein the second portion of information is determined by inference based upon, at least in part, the answer for the question.

17. The computing system of claim 15 wherein the sequence of the plurality of questions to be generated is determined based upon, at least in part, one of user information, context, and a probability that the second portion of information is needed to provide the response to the query.

18. The computing system of claim 15 wherein the second portion of information is absent from the answer for the question.

19. The computing system of claim 15 wherein the operations further comprise:
  identifying a service for a second object associated with the object; and
  generating one or more additional questions associated with the service.

20. The computing system of claim 15 wherein the question is one of a direct question and an indirect question to determine the second portion of information.

* * * * *